United States Patent
Barnard et al.

(10) Patent No.: US 10,938,663 B2
(45) Date of Patent: Mar. 2, 2021

(54) DISCOVERY AND MANAGEMENT OF DEVICES

(71) Applicant: ServiceNow, Inc., Santa Clara, CA (US)

(72) Inventors: Bryan Mather Barnard, Kirkland, WA (US); Silas Andrew Smith, San Diego, CA (US); William Michael Lisac, San Diego, CA (US); Jerrold Henry Jones, La Mesa, CA (US); Jonathan Sparks, San Diego, CA (US)

(73) Assignee: ServiceNow, Inc., Santa Clara, CA (US)

( * ) Notice: Subject to any disclaimer, the term of this patent is extended or adjusted under 35 U.S.C. 154(b) by 182 days.

(21) Appl. No.: 16/058,112

(22) Filed: Aug. 8, 2018

(65) Prior Publication Data

US 2019/0342179 A1     Nov. 7, 2019

Related U.S. Application Data

(60) Provisional application No. 62/667,716, filed on May 7, 2018.

(51) Int. Cl.
    *G06F 15/16*          (2006.01)
    *H04L 12/24*          (2006.01)
                   (Continued)

(52) U.S. Cl.
    CPC .............. *H04L 41/12* (2013.01); *G06F 16/27* (2019.01); *H04L 41/20* (2013.01); *H04L 69/16* (2013.01)

(58) Field of Classification Search
    CPC ......... G06F 16/27; H04L 41/12; H04L 41/20; H04L 67/16; H04L 69/16
    See application file for complete search history.

(56) References Cited

U.S. PATENT DOCUMENTS 5,978,594 A    11/1999   Bonnell
6,321,229 B1   11/2001   Goldman
               (Continued)

FOREIGN PATENT DOCUMENTS

WO     WO2008124941 A1     4/2008

*Primary Examiner* — Moustafa M Meky
*Assistant Examiner* — Thorne E Waugh
(74) *Attorney, Agent, or Firm* — Fletcher Yoder PC

(57) ABSTRACT

An embodiment includes a computational instance managing a managed network of computing devices, some communicating by proprietary protocol, and comprising a database storing representations of the computing devices and one or more sets of program logic configured to support the proprietary protocol, as well as one or more server devices configured to: receive, from an edge gateway software application, a request identifying a particular computing device on the managed network that communicates by the proprietary protocol; based on this request, select a set of the program logic configured to support the proprietary protocol; transmit a representation of the program logic, receipt of which is configured to cause the edge gateway software application to execute the set of program logic and obtain thereby configuration and state information from the particular computing device; receive, from the edge gateway software application, the configuration and state information; and store the configuration and state information.

15 Claims, 17 Drawing Sheets

(51) Int. Cl.
*H04L 29/06* (2006.01)
*G06F 16/27* (2019.01)

(56) References Cited

U.S. PATENT DOCUMENTS

| | | | |
|---|---|---|---|
| 6,799,189 B2 | 9/2004 | Huxoll | |
| 6,816,898 B1 | 11/2004 | Scarpelli | |
| 6,895,586 B1 | 5/2005 | Brasher | |
| 6,916,898 B2 | 7/2005 | Kuroki et al. | |
| 7,020,706 B2 | 3/2006 | Cates | |
| 7,027,411 B1 | 4/2006 | Pulsipher | |
| 7,392,300 B2 | 6/2008 | Anantharangachar | |
| 7,617,073 B2 | 11/2009 | Trinon | |
| 7,685,167 B2 | 3/2010 | Mueller | |
| 7,716,353 B2 | 5/2010 | Golovinsky | |
| 7,729,284 B2 * | 6/2010 | Ukrainetz | H04L 29/12216 370/254 |
| 7,769,718 B2 | 8/2010 | Murley | |
| 7,877,783 B1 | 1/2011 | Cline | |
| 7,925,981 B2 | 4/2011 | Pourheidari | |
| 7,933,927 B2 | 4/2011 | Dee | |
| 7,941,506 B2 | 5/2011 | Bonal | |
| 7,945,860 B2 | 5/2011 | Vambenepe | |
| 8,065,411 B2 * | 11/2011 | Spiess | H04L 43/00 709/224 |
| 8,082,222 B2 | 12/2011 | Rangarajan | |
| 8,176,112 B2 * | 5/2012 | Hicks, IIII et al. | H04N 21/44227 709/200 |
| 8,346,752 B2 | 1/2013 | Sirota | |
| 8,380,645 B2 | 2/2013 | Kowalski | |
| 8,402,127 B2 | 3/2013 | Solin | |
| 8,554,750 B2 | 10/2013 | Rangaranjan | |
| 8,612,408 B2 | 12/2013 | Trinon | |
| 8,646,093 B2 | 2/2014 | Myers | |
| 8,683,032 B2 | 3/2014 | Spinelli | |
| 8,745,040 B2 | 6/2014 | Kowalski | |
| 8,812,539 B2 | 8/2014 | Mikousheff | |
| 8,818,994 B2 | 8/2014 | Kowalski | |
| 8,832,652 B2 | 9/2014 | Mueller | |
| 8,907,988 B2 | 12/2014 | Poston | |
| 9,015,188 B2 | 4/2015 | Behne | |
| 9,037,536 B2 | 4/2015 | Vos | |
| 9,065,783 B2 | 6/2015 | Ding | |
| 9,098,322 B2 | 8/2015 | Apte | |
| 9,137,115 B2 | 9/2015 | Mayfield | |
| 9,326,372 B2 | 2/2016 | Cline | |
| 9,317,327 B2 | 4/2016 | Apte | |
| 9,323,801 B2 | 4/2016 | Morozov | |
| 9,363,252 B2 | 6/2016 | Mueller | |
| 9,412,084 B2 | 9/2016 | Kowalski | |
| 9,467,344 B2 | 10/2016 | Gere | |
| 9,534,903 B2 | 1/2017 | Cline | |
| 9,535,737 B2 | 1/2017 | Joy | |
| 9,613,070 B2 | 4/2017 | Kumar | |
| 9,631,934 B2 | 4/2017 | Cline | |
| 9,645,473 B2 | 5/2017 | Mueller | |
| 9,654,473 B2 | 5/2017 | Miller | |
| 9,659,051 B2 | 5/2017 | Hutchins | |
| 9,766,935 B2 | 9/2017 | Kelkar | |
| 9,792,387 B2 | 10/2017 | George | |
| 9,805,322 B2 | 10/2017 | Kelkar | |
| 9,852,165 B2 | 12/2017 | Morozov | |
| 9,967,162 B2 | 5/2018 | Spinelli | |
| 10,002,203 B2 | 6/2018 | George | |
| 10,054,919 B2 * | 8/2018 | Westrick, Jr. | G05B 15/02 |
| 10,389,589 B2 * | 8/2019 | Grisco | G06F 16/2282 |
| 2004/0148388 A1 * | 7/2004 | Chung | H04L 41/0806 709/224 |
| 2006/0159032 A1 * | 7/2006 | Ukrainetz | H04L 41/26 370/254 |
| 2007/0226777 A1 * | 9/2007 | Burton | H04L 63/08 726/2 |
| 2007/0283001 A1 * | 12/2007 | Spiess | H04L 43/00 709/224 |
| 2016/0359664 A1 | 6/2016 | Malegaonkar et al. | |
| 2017/0364046 A1 * | 12/2017 | Westrick, Jr. | G05B 15/02 |
| 2018/0034913 A1 * | 2/2018 | Matthieu | H04W 12/0609 |
| 2018/0183882 A1 * | 6/2018 | Flynn | H04L 67/34 |
| 2019/0265661 A1 * | 8/2019 | Sakellariadis | G06F 16/951 |

\* cited by examiner

DISCOVERY AND MANAGEMENT OF DEVICES

REFERENCE TO RELATED APPLICATION

This application claims priority to U.S. Provisional Patent Application No. 62/667,716, filed on May 7, 2018, the entirety of which is hereby incorporated by reference.

BACKGROUND

A managed network (e.g., an enterprise network) is often a complex entity with many interrelated components carrying out various operations. Such a network may contain devices that are easily discovered and controlled in a predictable manner using standard access protocols. However, the network may also contain devices that do not support common access protocols. Some of these devices may support only proprietary protocols, while others might not even connect directly to the network. Therefore, conventional device discovery mechanisms might not be able to discover and manage such devices.

SUMMARY

Described herein are embodiments that detail the use an edge gateway to facilitate communication with devices on a network. Specifically, the embodiments herein describe the use of an edge gateway that has the ability to communicate to the devices in accordance with non-standard or proprietary protocols supported by these devices. Further embodiments illustrate that the edge gateway may also be able to receive program logic containing routines or scripts that can be executed on the edge gateway so that the discovery of and any eventual orchestrations involving one or more devices on the network can be effectively and efficiently performed.

Further, the edge gateway may discover or be configured with descriptions, properties, and/or capabilities of the devices on the network, and may provide digital representations thereof to a database for storage as configuration items. Based on the information contained in these digital representations, a computational instance of a remote network management platform with access to the database may create or update tasks for the edge gateway to undertake, which may allow the edge gateway (as well as the computational instance) to more effectively communicate with and manage the devices on the network. In this way, the edge gateway may act as a bridge by which this data can be gathered, analyzed, and utilized to improve operational processes. Thus, with the embodiments herein, the remote network management platform can be used to manage virtually any type of device on virtually any type of network, including non-standard devices and networks.

Accordingly, a first example embodiment may involve a computational instance of a remote network management platform, wherein the computational instance manages a managed network containing computing devices, at least some of which communicate by way of a proprietary protocol. The first example embodiment may also involve the computational instance comprising a database storing representations of the computing devices in the managed network as configuration items, and one or more sets of program logic configured to support the proprietary protocol, and one or more server devices configured to: (i) receive, from an edge gateway software application associated with the managed network, a request that identifies a particular computing device on the managed network that communicates by way of the proprietary protocol; (ii) based on the request, select a set of the program logic, from the one or more sets of program logic, that is configured to support the proprietary protocol; (iii) transmit, to the edge gateway software application, a representation of the program logic, receipt of which is configured to cause the edge gateway software application to be able to execute the set of program logic and obtain thereby configuration and state information from the particular computing device; (iv) receive, from the edge gateway software application, the configuration and state information, and (v) store, in the database, the configuration and state information.

In a second example embodiment, an article of manufacture may include a non-transitory computer-readable medium, having stored thereon program instructions that, upon execution by a computing system, cause the computing system to perform operations in accordance with the first example embodiment.

In a third example embodiment, a computing system may include at least one processor, as well as memory and program instructions. The program instructions may be stored in the memory, and upon execution by the at least one processor, cause the computing system to perform operations in accordance with the first example embodiment.

In a fourth example embodiment, a system may include various means for carrying out each of the operations of the first example embodiment.

These as well as other embodiments, aspects, advantages, and alternatives will become apparent to those of ordinary skill in the art by reading the following detailed description, with reference where appropriate to the accompanying drawings. Further, this summary and other descriptions and figures provided herein are intended to illustrate embodiments by way of example only and, as such, that numerous variations are possible. For instance, structural elements and process steps can be rearranged, combined, distributed, eliminated, or otherwise changed, while remaining within the scope of the embodiments as claimed.

DETAILED DESCRIPTION

Figure 1:
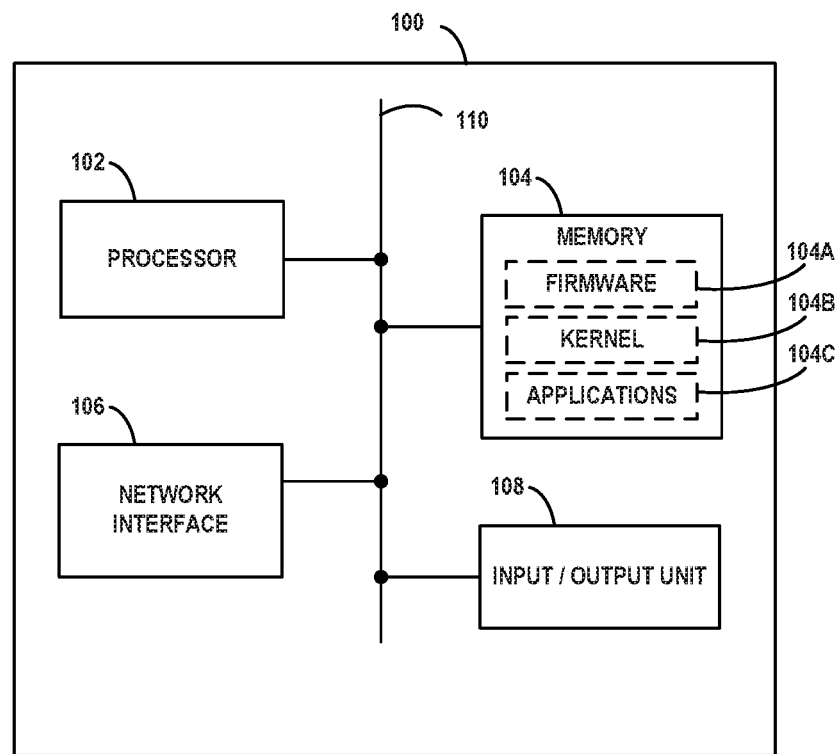
FIG. 1 illustrates a schematic drawing of a computing device, in accordance with example embodiments.

Example methods, devices, and systems are described herein. It should be understood that the words "example" and "exemplary" are used herein to mean "serving as an example, instance, or illustration." Any embodiment or feature described herein as being an "example" or "exemplary" is not necessarily to be construed as preferred or advantageous over other embodiments or features unless stated as such. Thus, other embodiments can be utilized and other changes can be made without departing from the scope of the subject matter presented herein.

Accordingly, the example embodiments described herein are not meant to be limiting. It will be readily understood that the aspects of the present disclosure, as generally described herein, and illustrated in the figures, can be arranged, substituted, combined, separated, and designed in a wide variety of different configurations. For example, the separation of features into "client" and "server" components may occur in a number of ways.

Further, unless context suggests otherwise, the features illustrated in each of the figures may be used in combination with one another. Thus, the figures should be generally viewed as component aspects of one or more overall embodiments, with the understanding that not all illustrated features are necessary for each embodiment.

Additionally, any enumeration of elements, blocks, or steps in this specification or the claims is for purposes of clarity. Thus, such enumeration should not be interpreted to require or imply that these elements, blocks, or steps adhere to a particular arrangement or are carried out in a particular order.

I. Introduction

A large enterprise is a complex entity with many interrelated operations. Some of these are found across the enterprise, such as human resources (HR), supply chain, information technology (IT), and finance. However, each enterprise also has its own unique operations that provide essential capabilities and/or create competitive advantages.

To support widely-implemented operations, enterprises typically use off-the-shelf software applications, such as customer relationship management (CRM) and human capital management (HCM) packages. However, they may also need custom software applications to meet their own unique requirements. A large enterprise often has dozens or hundreds of these custom software applications. Nonetheless, the advantages provided by the embodiments herein are not limited to large enterprises and may be applicable to an enterprise, or any other type of organization, of any size.

Many such software applications are developed by individual departments within the enterprise. These range from simple spreadsheets to custom-built software tools and databases. But the proliferation of siloed custom software applications has numerous disadvantages. It negatively impacts an enterprise's ability to run and grow its operations, innovate, and meet regulatory requirements. The enterprise may find it difficult to integrate, streamline and enhance its operations due to lack of a single system that unifies its subsystems and data.

To efficiently create custom applications, enterprises would benefit from a remotely-hosted application platform that eliminates unnecessary development complexity. The goal of such a platform would be to reduce time-consuming, repetitive application development tasks so that software engineers and individuals in other roles can focus on developing unique, high-value features.

In order to achieve this goal, the concept of Application Platform as a Service (aPaaS) is introduced, to intelligently automate workflows throughout the enterprise. An aPaaS system is hosted remotely from the enterprise, but may access data, applications, and services within the enterprise by way of secure connections. Such an aPaaS system may have a number of advantageous capabilities and characteristics. These advantages and characteristics may be able to improve the enterprise's operations and workflow for IT, HR, CRM, customer service, application development, and security.

The aPaaS system may support development and execution of model-view-controller (MVC) applications. MVC applications divide their functionality into three interconnected parts (model, view, and controller) in order to isolate representations of information from the manner in which the information is presented to the user, thereby allowing for efficient code reuse and parallel development. These applications may be web-based, and offer create, read, update, delete (CRUD) capabilities. This allows new applications to be built on a common application infrastructure.

The aPaaS system may support standardized application components, such as a standardized set of widgets for graphical user interface (GUI) development. In this way, applications built using the aPaaS system have a common look and feel. Other software components and modules may be standardized as well. In some cases, this look and feel can be branded or skinned with an enterprise's custom logos and/or color schemes.

The aPaaS system may support the ability to configure the behavior of applications using metadata. This allows application behaviors to be rapidly adapted to meet specific needs. Such an approach reduces development time and increases flexibility. Further, the aPaaS system may support GUI tools that facilitate metadata creation and management, thus reducing errors in the metadata.

The aPaaS system may support clearly-defined interfaces between applications, so that software developers can avoid unwanted inter-application dependencies. Thus, the aPaaS system may implement a service layer in which persistent state information and other data is stored.

The aPaaS system may support a rich set of integration features so that the applications thereon can interact with legacy applications and third-party applications. For instance, the aPaaS system may support a custom employee-onboarding system that integrates with legacy HR, IT, and accounting systems.

The aPaaS system may support enterprise-grade security. Furthermore, since the aPaaS system may be remotely hosted, it should also utilize security procedures when it interacts with systems in the enterprise or third-party networks and services hosted outside of the enterprise. For example, the aPaaS system may be configured to share data amongst the enterprise and other parties to detect and identify common security threats.

Other features, functionality, and advantages of an aPaaS system may exist. This description is for purpose of example and is not intended to be limiting.

As an example of the aPaaS development process, a software developer may be tasked to create a new application using the aPaaS system. First, the developer may define the data model, which specifies the types of data that the application uses and the relationships therebetween. Then, via a GUI of the aPaaS system, the developer enters (e.g., uploads) the data model. The aPaaS system automatically creates all of the corresponding database tables, fields, and relationships, which can then be accessed via an object-oriented services layer.

In addition, the aPaaS system can also build a fully-functional MVC application with client-side interfaces and server-side CRUD logic. This generated application may serve as the basis of further development for the user. Advantageously, the developer does not have to spend a large amount of time on basic application functionality. Further, since the application may be web-based, it can be accessed from any Internet-enabled client device. Alternatively or additionally, a local copy of the application may be able to be accessed, for instance, when Internet service is not available.

The aPaaS system may also support a rich set of pre-defined functionality that can be added to applications. These features include support for searching, email, templating, workflow design, reporting, analytics, social media, scripting, mobile-friendly output, and customized GUIs.

The following embodiments describe architectural and functional aspects of example aPaaS systems, as well as the features and advantages thereof.

II. Example Computing Devices and Cloud-Based Computing Environments

FIG. 1 is a simplified block diagram exemplifying a computing device 100, illustrating some of the components that could be included in a computing device arranged to operate in accordance with the embodiments herein. Computing device 100 could be a client device (e.g., a device actively operated by a user), a server device (e.g., a device that provides computational services to client devices), or some other type of computational platform. Some server devices may operate as client devices from time to time in order to perform particular operations, and some client devices may incorporate server features.

In this example, computing device 100 includes processor 102, memory 104, network interface 106, and an input/output unit 108, all of which may be coupled by a system bus 110 or a similar mechanism. In some embodiments, computing device 100 may include other components and/or peripheral devices (e.g., detachable storage, printers, and so on).

Processor 102 may be one or more of any type of computer processing element, such as a central processing unit (CPU), a co-processor (e.g., a mathematics, graphics, or encryption co-processor), a digital signal processor (DSP), a network processor, and/or a form of integrated circuit or controller that performs processor operations. In some cases, processor 102 may be one or more single-core processors. In other cases, processor 102 may be one or more multi-core processors with multiple independent processing units. Processor 102 may also include register memory for temporarily storing instructions being executed and related data, as well as cache memory for temporarily storing recently-used instructions and data.

Memory 104 may be any form of computer-usable memory, including but not limited to random access memory (RAM), read-only memory (ROM), and non-volatile memory (e.g., flash memory, hard disk drives, solid state drives, compact discs (CDs), digital video discs (DVDs), and/or tape storage). Thus, memory 104 represents both main memory units, as well as long-term storage. Other types of memory may include biological memory.

Memory 104 may store program instructions and/or data on which program instructions may operate. By way of example, memory 104 may store these program instructions on a non-transitory, computer-readable medium, such that the instructions are executable by processor 102 to carry out any of the methods, processes, or operations disclosed in this specification or the accompanying drawings.

As shown in FIG. 1, memory 104 may include firmware 104A, kernel 104B, and/or applications 104C. Firmware 104A may be program code used to boot or otherwise initiate some or all of computing device 100. Kernel 104B may be an operating system, including modules for memory management, scheduling and management of processes, input/output, and communication. Kernel 104B may also include device drivers that allow the operating system to communicate with the hardware modules (e.g., memory units, networking interfaces, ports, and busses), of computing device 100. Applications 104C may be one or more user-space software programs, such as web browsers or email clients, as well as any software libraries used by these programs. Memory 104 may also store data used by these and other programs and applications.

Network interface 106 may take the form of one or more wireline interfaces, such as Ethernet (e.g., Fast Ethernet, Gigabit Ethernet, and so on). Network interface 106 may also support communication over one or more non-Ethernet media, such as coaxial cables or power lines, or over wide-area media, such as Synchronous Optical Networking (SONET) or digital subscriber line (DSL) technologies. Network interface 106 may additionally take the form of one or more wireless interfaces, such as IEEE 802.11 (Wifi), BLUETOOTH®, global positioning system (GPS), or a wide-area wireless interface. However, other forms of physical layer interfaces and other types of standard or proprietary communication protocols may be used over network interface 106. Furthermore, network interface 106 may comprise multiple physical interfaces. For instance, some embodiments of computing device 100 may include Ethernet, BLUETOOTH®, and Wifi interfaces.

Input/output unit 108 may facilitate user and peripheral device interaction with example computing device 100. Input/output unit 108 may include one or more types of input devices, such as a keyboard, a mouse, a touch screen, and so on. Similarly, input/output unit 108 may include one or more types of output devices, such as a screen, monitor, printer, and/or one or more light emitting diodes (LEDs). Additionally or alternatively, computing device 100 may communicate with other devices using a universal serial bus (USB) or high-definition multimedia interface (HDMI) port interface, for example.

In some embodiments, one or more instances of computing device 100 may be deployed to support an aPaaS architecture. The exact physical location, connectivity, and configuration of these computing devices may be unknown and/or unimportant to client devices. Accordingly, the computing devices may be referred to as "cloud-based" devices that may be housed at various remote data center locations.

Figure 2:
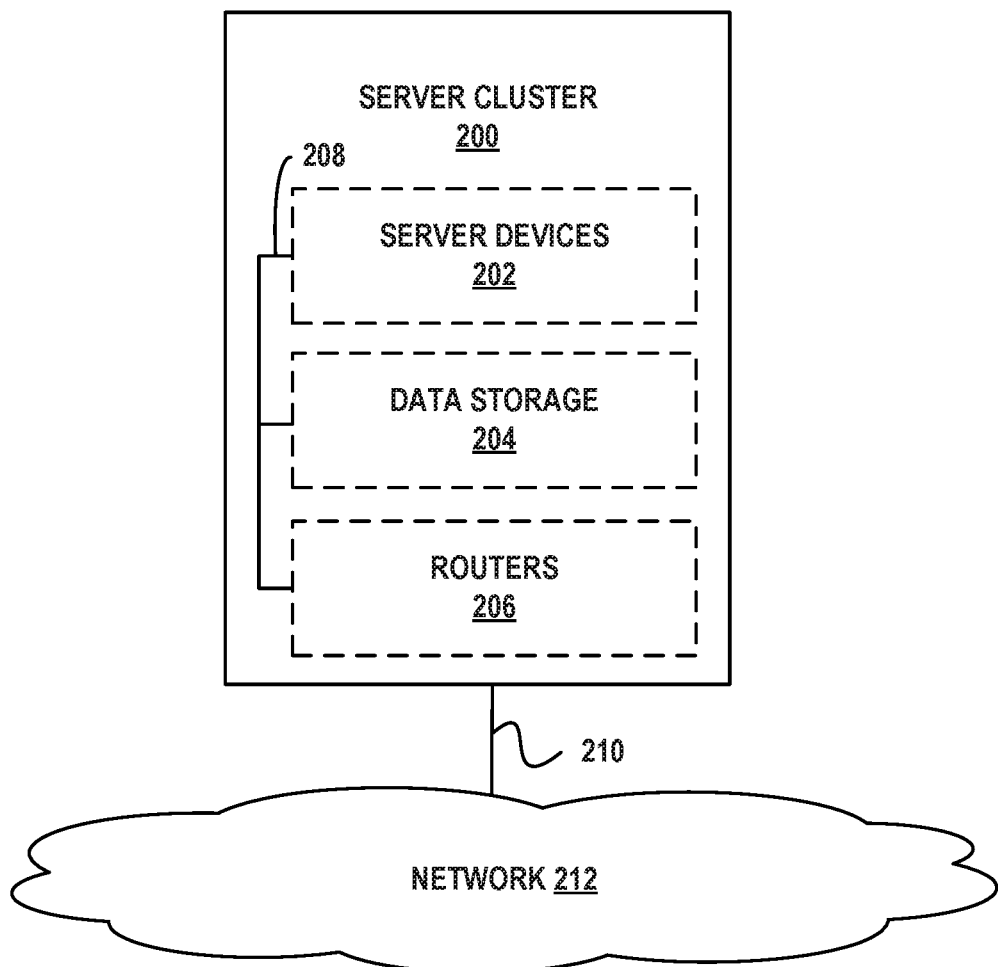
FIG. 2 illustrates a schematic drawing of a server device cluster, in accordance with example embodiments.

FIG. 2 depicts a cloud-based server cluster 200 in accordance with example embodiments. In FIG. 2, operations of a computing device (e.g., computing device 100) may be distributed between server devices 202, data storage 204, and routers 206, all of which may be connected by local cluster network 208. The number of server devices 202, data storages 204, and routers 206 in server cluster 200 may depend on the computing task(s) and/or applications assigned to server cluster 200.

For example, server devices 202 can be configured to perform various computing tasks of computing device 100. Thus, computing tasks can be distributed among one or more of server devices 202. To the extent that these computing tasks can be performed in parallel, such a distribution of tasks may reduce the total time to complete these tasks and return a result. For purpose of simplicity, both server cluster 200 and individual server devices 202 may be referred to as a "server device." This nomenclature should be understood to imply that one or more distinct server devices, data storage devices, and cluster routers may be involved in server device operations.

Data storage 204 may be data storage arrays that include drive array controllers configured to manage read and write access to groups of hard disk drives and/or solid state drives. The drive array controllers, alone or in conjunction with server devices 202, may also be configured to manage backup or redundant copies of the data stored in data storage 204 to protect against drive failures or other types of failures that prevent one or more of server devices 202 from accessing units of cluster data storage 204. Other types of memory aside from drives may be used.

Routers 206 may include networking equipment configured to provide internal and external communications for server cluster 200. For example, routers 206 may include one or more packet-switching and/or routing devices (including switches and/or gateways) configured to provide (i) network communications between server devices 202 and data storage 204 via cluster network 208, and/or (ii) network communications between the server cluster 200 and other devices via communication link 210 to network 212.

Additionally, the configuration of cluster routers 206 can be based at least in part on the data communication requirements of server devices 202 and data storage 204, the latency and throughput of the local cluster network 208, the latency, throughput, and cost of communication link 210, and/or other factors that may contribute to the cost, speed, fault-tolerance, resiliency, efficiency and/or other design goals of the system architecture.

As a possible example, data storage 204 may include any form of database, such as a structured query language (SQL) database. Various types of data structures may store the information in such a database, including but not limited to tables, arrays, lists, trees, and tuples. Furthermore, any databases in data storage 204 may be monolithic or distributed across multiple physical devices.

Server devices 202 may be configured to transmit data to and receive data from cluster data storage 204. This transmission and retrieval may take the form of SQL queries or other types of database queries, and the output of such queries, respectively. Additional text, images, video, and/or audio may be included as well. Furthermore, server devices 202 may organize the received data into web page representations. Such a representation may take the form of a markup language, such as the hypertext markup language (HTML), the extensible markup language (XML), or some other standardized or proprietary format. Moreover, server devices 202 may have the capability of executing various types of computerized scripting languages, such as but not limited to Perl, Python, PHP Hypertext Preprocessor (PHP), Active Server Pages (ASP), JavaScript, and so on. Computer program code written in these languages may facilitate the providing of web pages to client devices, as well as client device interaction with the web pages.

III. Example Remote Network Management Architecture

Figure 3:
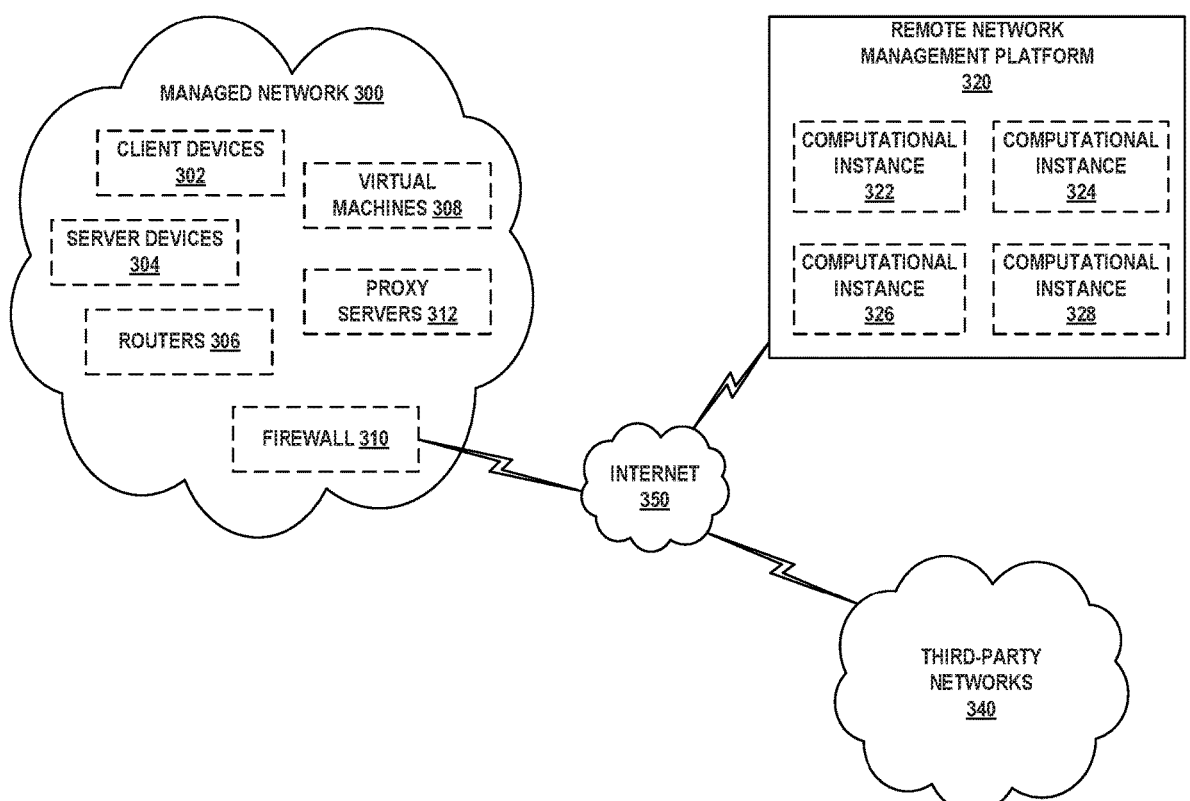
FIG. 3 depicts a remote network management architecture, in accordance with example embodiments.

FIG. 3 depicts a remote network management architecture, in accordance with example embodiments. This architecture includes three main components, managed network 300, remote network management platform 320, and third-party networks 340, all connected by way of Internet 350.

Managed network 300 may be, for example, an enterprise network used by an entity for computing and communications tasks, as well as storage of data. Thus, managed network 300 may include various client devices 302, server devices 304, routers 306, virtual machines 308, firewall 310, and/or proxy servers 312. Client devices 302 may be embodied by computing device 100, server devices 304 may be embodied by computing device 100 or server cluster 200, and routers 306 may be any type of router, switch, or gateway.

Virtual machines 308 may be embodied by one or more of computing device 100 or server cluster 200. In general, a virtual machine is an emulation of a computing system, and mimics the functionality (e.g., processor, memory, and communication resources) of a physical computer. One physical computing system, such as server cluster 200, may support up to thousands of individual virtual machines. In some embodiments, virtual machines 308 may be managed by a centralized server device or application that facilitates allocation of physical computing resources to individual virtual machines, as well as performance and error reporting. Enterprises often employ virtual machines in order to allocate computing resources in an efficient, as needed fashion. Providers of virtualized computing systems include VMWARE® and MICROSOFT®.

Firewall 310 may be one or more specialized routers or server devices that protect managed network 300 from unauthorized attempts to access the devices, applications, and services therein, while allowing authorized communication that is initiated from managed network 300. Firewall 310 may also provide intrusion detection, web filtering, virus scanning, application-layer gateways, and other applications or services. In some embodiments not shown in FIG. 3, managed network 300 may include one or more virtual private network (VPN) gateways with which it communicates with remote network management platform 320 (see below).

Managed network 300 may also include one or more proxy servers 312. An embodiment of proxy servers 312 may be a server device that facilitates communication and movement of data between managed network 300, remote network management platform 320, and third-party networks 340. In particular, proxy servers 312 may be able to establish and maintain secure communication sessions with one or more computational instances of remote network management platform 320. By way of such a session, remote network management platform 320 may be able to discover and manage aspects of the architecture and configuration of managed network 300 and its components. Possibly with the assistance of proxy servers 312, remote network management platform 320 may also be able to discover and manage aspects of third-party networks 340 that are used by managed network 300.

Firewalls, such as firewall 310, typically deny all communication sessions that are incoming by way of Internet 350, unless such a session was ultimately initiated from behind the firewall (i.e., from a device on managed network 300) or the firewall has been explicitly configured to support the session. By placing proxy servers 312 behind firewall 310 (e.g., within managed network 300 and protected by firewall 310), proxy servers 312 may be able to initiate these communication sessions through firewall 310. Thus, firewall 310 might not have to be specifically configured to support incoming sessions from remote network management platform 320, thereby avoiding potential security risks to managed network 300.

In some cases, managed network 300 may consist of a few devices and a small number of networks. In other deployments, managed network 300 may span multiple physical locations and include hundreds of networks and hundreds of thousands of devices. Thus, the architecture depicted in FIG. 3 is capable of scaling up or down by orders of magnitude.

Furthermore, depending on the size, architecture, and connectivity of managed network 300, a varying number of proxy servers 312 may be deployed therein. For example, each one of proxy servers 312 may be responsible for communicating with remote network management platform 320 regarding a portion of managed network 300. Alternatively or additionally, sets of two or more proxy servers may be assigned to such a portion of managed network 300 for purposes of load balancing, redundancy, and/or high availability.

Remote network management platform 320 is a hosted environment that provides aPaaS services to users, particularly to the operators of managed network 300. These services may take the form of web-based portals, for instance. Thus, a user can securely access remote network management platform 320 from, for instance, client devices 302, or potentially from a client device outside of managed network 300. By way of the web-based portals, users may design, test, and deploy applications, generate reports, view analytics, and perform other tasks.

As shown in FIG. 3, remote network management platform 320 includes four computational instances 322, 324, 326, and 328. Each of these instances may represent a set of web portals, services, and applications (e.g., a wholly-functioning aPaaS system) available to a particular customer. In some cases, a single customer may use multiple computational instances. For example, managed network 300 may be an enterprise customer of remote network management platform 320, and may use computational instances 322, 324, and 326. The reason for providing multiple instances to one customer is that the customer may wish to independently develop, test, and deploy its applications and services. Thus, computational instance 322 may be dedicated to application development related to managed network 300, computational instance 324 may be dedicated to testing these applications, and computational instance 326 may be dedicated to the live operation of tested applications and services. A computational instance may also be referred to as a hosted instance, a remote instance, a customer instance, or by some other designation.

The multi-instance architecture of remote network management platform 320 is in contrast to conventional multi-tenant architectures, over which multi-instance architectures have several advantages. In multi-tenant architectures, data from different customers (e.g., enterprises) are comingled in a single database. While these customers' data are separate from one another, the separation is enforced by the software that operates the single database. As a consequence, a security breach in this system may impact all customers' data, creating additional risk, especially for entities subject to governmental, healthcare, and/or financial regulation. Furthermore, any database operations that impact one customer will likely impact all customers sharing that database. Thus, if there is an outage due to hardware or software errors, this outage affects all such customers. Likewise, if the database is to be upgraded to meet the needs of one customer, it will be unavailable to all customers during the upgrade process. Often, such maintenance windows will be long, due to the size of the shared database.

In contrast, the multi-instance architecture provides each customer with its own database in a dedicated computing instance. This prevents comingling of customer data, and allows each instance to be independently managed. For example, when one customer's instance experiences an outage due to errors or an upgrade, other computational instances are not impacted. Maintenance down time is limited because the database only contains one customer's data. Further, the simpler design of the multi-instance architecture allows redundant copies of each customer database and instance to be deployed in a geographically diverse fashion. This facilitates high availability, where the live version of the customer's instance can be moved when faults are detected or maintenance is being performed.

In order to support multiple computational instances in an efficient fashion, remote network management platform 320 may implement a plurality of these instances on a single hardware platform. For example, when the aPaaS system is implemented on a server cluster such as server cluster 200, it may operate a virtual machine that dedicates varying amounts of computational, storage, and communication resources to instances. But full virtualization of server cluster 200 might not be necessary, and other mechanisms may be used to separate instances. In some examples, each instance may have a dedicated account and one or more dedicated databases on server cluster 200. Alternatively, computational instance 322 may span multiple physical devices.

In some cases, a single server cluster of remote network management platform 320 may support multiple independent enterprises. Furthermore, as described below, remote network management platform 320 may include multiple server clusters deployed in geographically diverse data centers in order to facilitate load balancing, redundancy, and/or high availability.

Third-party networks 340 may be remote server devices (e.g., a plurality of server clusters such as server cluster 200) that can be used for outsourced computational, data storage, communication, and service hosting operations. These servers may be virtualized (i.e., the servers may be virtual machines). Examples of third-party networks 340 may include AMAZON WEB SERVICES® and MICROSOFT® Azure. Like remote network management platform 320, multiple server clusters supporting third-party networks 340 may be deployed at geographically diverse locations for purposes of load balancing, redundancy, and/or high availability.

Managed network 300 may use one or more of third-party networks 340 to deploy applications and services to its clients and customers. For instance, if managed network 300 provides online music streaming services, third-party networks 340 may store the music files and provide web interface and streaming capabilities. In this way, the enterprise of managed network 300 does not have to build and maintain its own servers for these operations.

Remote network management platform 320 may include modules that integrate with third-party networks 340 to expose virtual machines and managed services therein to managed network 300. The modules may allow users to request virtual resources and provide flexible reporting for third-party networks 340. In order to establish this functionality, a user from managed network 300 might first establish an account with third-party networks 340, and request a set of associated resources. Then, the user may enter the account information into the appropriate modules of remote network management platform 320. These modules may then automatically discover the manageable resources in the account, and also provide reports related to usage, performance, and billing.

Internet 350 may represent a portion of the global Internet. However, Internet 350 may alternatively represent a different type of network, such as a private wide-area or local-area packet-switched network.

Figure 4:
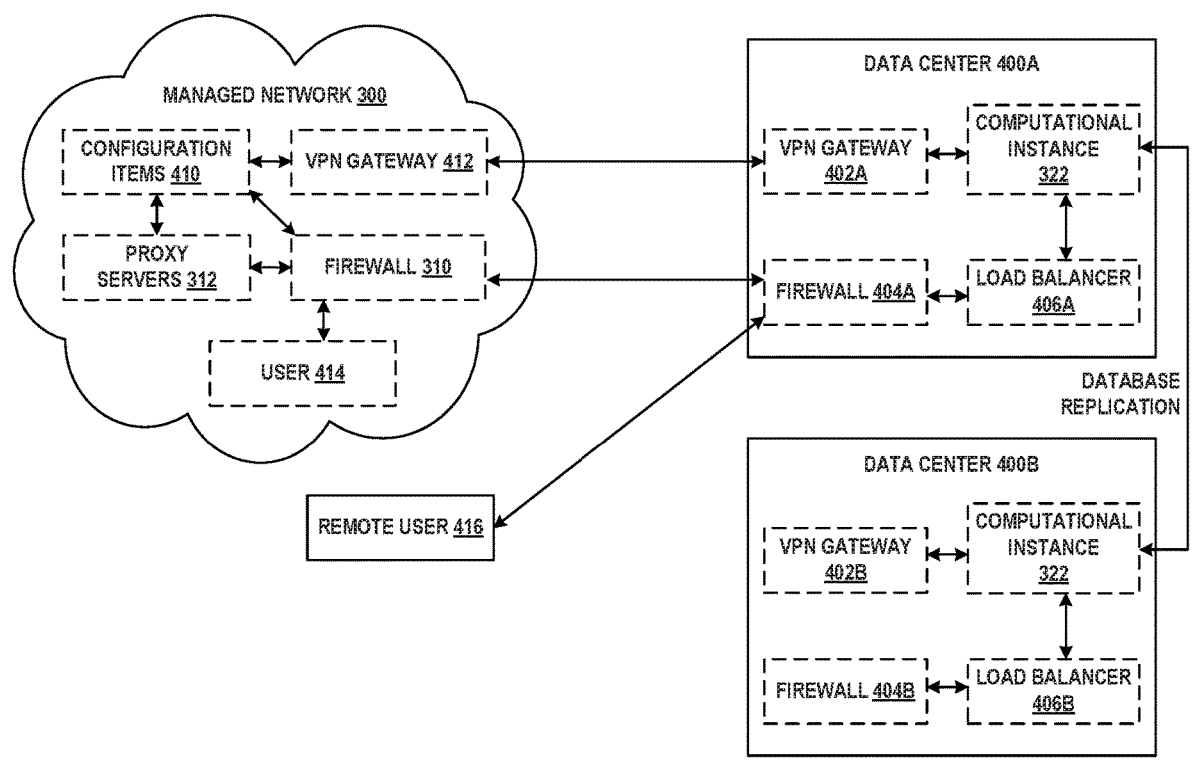
FIG. 4 depicts a communication environment involving a remote network management architecture, in accordance with example embodiments.

FIG. 4 further illustrates the communication environment between managed network 300 and computational instance 322, and introduces additional features and alternative embodiments. In FIG. 4, computational instance 322 is replicated across data centers 400A and 400B. These data centers may be geographically distant from one another, perhaps in different cities or different countries. Each data center includes support equipment that facilitates communication with managed network 300, as well as remote users.

In data center 400A, network traffic to and from external devices flows either through VPN gateway 402A or firewall 404A. VPN gateway 402A may be peered with VPN gateway 412 of managed network 300 by way of a security protocol such as Internet Protocol Security (IPSEC) or Transport Layer Security (TLS). Firewall 404A may be configured to allow access from authorized users, such as user 414 and remote user 416, and to deny access to unauthorized users. By way of firewall 404A, these users may access computational instance 322, and possibly other computational instances. Load balancer 406A may be used to distribute traffic amongst one or more physical or virtual server devices that host computational instance 322. Load balancer 406A may simplify user access by hiding the internal configuration of data center 400A, (e.g., computational instance 322) from client devices. For instance, if computational instance 322 includes multiple physical or virtual computing devices that share access to multiple databases, load balancer 406A may distribute network traffic and processing tasks across these computing devices and databases so that no one computing device or database is significantly busier than the others. In some embodiments, computational instance 322 may include VPN gateway 402A, firewall 404A, and load balancer 406A.

Data center 400B may include its own versions of the components in data center 400A. Thus, VPN gateway 402B, firewall 404B, and load balancer 406B may perform the same or similar operations as VPN gateway 402A, firewall 404A, and load balancer 406A, respectively. Further, by way of real-time or near-real-time database replication and/or other operations, computational instance 322 may exist simultaneously in data centers 400A and 400B.

Data centers 400A and 400B as shown in FIG. 4 may facilitate redundancy and high availability. In the configuration of FIG. 4, data center 400A is active and data center 400B is passive. Thus, data center 400A is serving all traffic to and from managed network 300, while the version of computational instance 322 in data center 400B is being updated in near-real-time. Other configurations, such as one in which both data centers are active, may be supported.

Should data center 400A fail in some fashion or otherwise become unavailable to users, data center 400B can take over as the active data center. For example, domain name system (DNS) servers that associate a domain name of computational instance 322 with one or more Internet Protocol (IP) addresses of data center 400A may re-associate the domain name with one or more IP addresses of data center 400B. After this re-association completes (which may take less than one second or several seconds), users may access computational instance 322 by way of data center 400B.

FIG. 4 also illustrates a possible configuration of managed network 300. As noted above, proxy servers 312 and user 414 may access computational instance 322 through firewall 310. Proxy servers 312 may also access configuration items 410. In FIG. 4, configuration items 410 may refer to any or all of client devices 302, server devices 304, routers 306, and virtual machines 308, any applications or services executing thereon, as well as relationships between devices, applications, and services. Thus, the term "configuration items" may be shorthand for any physical or virtual device, or any application or service remotely discoverable or managed by computational instance 322, or relationships between discovered devices, applications, and services. Configuration items may be represented in a configuration management database (CMDB) of computational instance 322.

As noted above, VPN gateway 412 may provide a dedicated VPN to VPN gateway 402A. Such a VPN may be helpful when there is a significant amount of traffic between managed network 300 and computational instance 322, or security policies otherwise suggest or require use of a VPN between these sites. In some embodiments, any device in managed network 300 and/or computational instance 322 that directly communicates via the VPN is assigned a public IP address. Other devices in managed network 300 and/or computational instance 322 may be assigned private IP addresses (e.g., IP addresses selected from the 10.0.0.0-10.255.255.255 or 192.168.0.0-192.168.255.255 ranges, represented in shorthand as subnets 10.0.0.0/8 and 192.168.0.0/16, respectively).

IV. Example Device, Application, and Service Discovery

In order for remote network management platform 320 to administer the devices, applications, and services of managed network 300, remote network management platform 320 may first determine what devices are present in managed network 300, the configurations and operational statuses of these devices, and the applications and services provided by the devices, and well as the relationships between discovered devices, applications, and services. As noted above, each device, application, service, and relationship may be referred to as a configuration item. The process of defining configuration items within managed network 300 is referred to as discovery, and may be facilitated at least in part by proxy servers 312.

For purpose of the embodiments herein, an "application" may refer to one or more processes, threads, programs, client modules, server modules, or any other software that executes on a device or group of devices. A "service" may refer to a high-level capability provided by multiple applications executing on one or more devices working in conjunction with one another. For example, a high-level web service may involve multiple web application server threads executing on one device and accessing information from a database application that executes on another device.

Figure 5A:
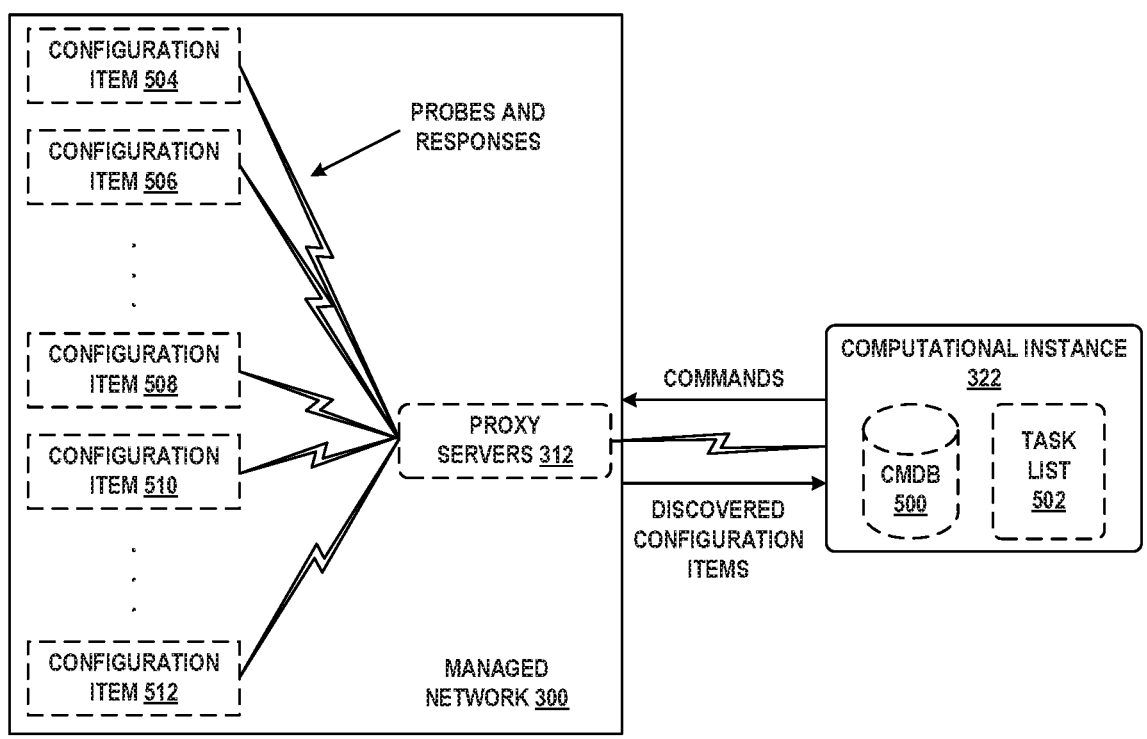
FIG. 5A depicts another communication environment involving a remote network management architecture, in accordance with example embodiments.

FIG. 5A provides a logical depiction of how configuration items can be discovered, as well as how information related to discovered configuration items can be stored. For sake of simplicity, remote network management platform 320, third-party networks 340, and Internet 350 are not shown.

In FIG. 5A, CMDB 500 and task list 502 are stored within computational instance 322. Computational instance 322 may transmit discovery commands to proxy servers 312. In response, proxy servers 312 may transmit probes to various devices, applications, and services in managed network 300. These devices, applications, and services may transmit responses to proxy servers 312, and proxy servers 312 may then provide information regarding discovered configuration items to CMDB 500 for storage therein. Configuration items stored in CMDB 500 represent the environment of managed network 300.

Task list 502 represents a list of activities that proxy servers 312 are to perform on behalf of computational instance 322. As discovery takes place, task list 502 is populated. Proxy servers 312 repeatedly query task list 502, obtain the next task therein, and perform this task until task list 502 is empty or another stopping condition has been reached.

To facilitate discovery, proxy servers 312 may be configured with information regarding one or more subnets in managed network 300 that are reachable by way of proxy servers 312. For instance, proxy servers 312 may be given the IP address range 192.168.0/24 as a subnet. Then, computational instance 322 may store this information in CMDB 500 and place tasks in task list 502 for discovery of devices at each of these addresses.

FIG. 5A also depicts devices, applications, and services in managed network 300 as configuration items 504, 506, 508, 510, and 512. As noted above, these configuration items represent a set of physical and/or virtual devices (e.g., client devices, server devices, routers, or virtual machines), applications executing thereon (e.g., web servers, email servers, databases, or storage arrays), relationships therebetween, as well as services that involve multiple individual configuration items.

Placing the tasks in task list 502 may trigger or otherwise cause proxy servers 312 to begin discovery. Alternatively or additionally, discovery may be manually triggered or automatically triggered based on triggering events (e.g., discovery may automatically begin once per day at a particular time).

In general, discovery may proceed in four logical phases: scanning, classification, identification, and exploration. Each phase of discovery involves various types of probe messages being transmitted by proxy servers 312 to one or more devices in managed network 300. The responses to these probes may be received and processed by proxy servers 312, and representations thereof may be transmitted to CMDB 500. Thus, each phase can result in more configuration items being discovered and stored in CMDB 500.

In the scanning phase, proxy servers 312 may probe each IP address in the specified range of IP addresses for open Transmission Control Protocol (TCP) and/or User Datagram Protocol (UDP) ports to determine the general type of device. The presence of such open ports at an IP address may indicate that a particular application is operating on the device that is assigned the IP address, which in turn may identify the operating system used by the device. For example, if TCP port 135 is open, then the device is likely executing a WINDOWS® operating system. Similarly, if TCP port 22 is open, then the device is likely executing a UNIX® operating system, such as LINUX®. If UDP port 161 is open, then the device may be able to be further identified through the Simple Network Management Protocol (SNMP). Other possibilities exist. Once the presence of a device at a particular IP address and its open ports have been discovered, these configuration items are saved in CMDB 500.

In the classification phase, proxy servers 312 may further probe each discovered device to determine the version of its operating system. The probes used for a particular device are based on information gathered about the devices during the scanning phase. For example, if a device is found with TCP port 22 open, a set of UNIX®-specific probes may be used. Likewise, if a device is found with TCP port 135 open, a set of WINDOWS®-specific probes may be used. For either case, an appropriate set of tasks may be placed in task list 502 for proxy servers 312 to carry out. These tasks may result in proxy servers 312 logging on, or otherwise accessing information from the particular device. For instance, if TCP port 22 is open, proxy servers 312 may be instructed to initiate a Secure Shell (SSH) connection to the particular device and obtain information about the operating system thereon from particular locations in the file system. Based on this information, the operating system may be determined. As an example, a UNIX® device with TCP port 22 open may be classified as AIX®, HPUX, LINUX®, MACOS®, or SOLARIS®. This classification information may be stored as one or more configuration items in CMDB 500.

In the identification phase, proxy servers 312 may determine specific details about a classified device. The probes used during this phase may be based on information gathered about the particular devices during the classification phase. For example, if a device was classified as LINUX®, a set of LINUX®-specific probes may be used. Likewise if a device was classified as WINDOWS® 2012, as a set of WINDOWS®-2012-specific probes may be used. As was the case for the classification phase, an appropriate set of tasks may be placed in task list 502 for proxy servers 312 to carry out. These tasks may result in proxy servers 312 reading information from the particular device, such as basic input/output system (BIOS) information, serial numbers, network interface information, media access control address(es) assigned to these network interface(s), IP address(es) used by the particular device and so on. This identification information may be stored as one or more configuration items in CMDB 500.

In the exploration phase, proxy servers 312 may determine further details about the operational state of a classified device. The probes used during this phase may be based on information gathered about the particular devices during the classification phase and/or the identification phase. Again, an appropriate set of tasks may be placed in task list 502 for proxy servers 312 to carry out. These tasks may result in proxy servers 312 reading additional information from the particular device, such as processor information, memory information, lists of running processes (applications), and so on. Once more, the discovered information may be stored as one or more configuration items in CMDB 500.

Running discovery on a network device, such as a router, may utilize SNMP. Instead of or in addition to determining a list of running processes or other application-related information, discovery may determine additional subnets known to the router and the operational state of the router's network interfaces (e.g., active, inactive, queue length, number of packets dropped, etc.). The IP addresses of the additional subnets may be candidates for further discovery procedures. Thus, discovery may progress iteratively or recursively.

Once discovery completes, a snapshot representation of each discovered device, application, and service is available in CMDB 500. For example, after discovery, operating system version, hardware configuration and network configuration details for client devices, server devices, and routers in managed network 300, as well as applications executing thereon, may be stored. This collected information may be presented to a user in various ways to allow the user to view the hardware composition and operational status of devices, as well as the characteristics of services that span multiple devices and applications.

Furthermore, CMDB 500 may include entries regarding dependencies and relationships between configuration items. More specifically, an application that is executing on a particular server device, as well as the services that rely on this application, may be represented as such in CMDB 500. For instance, suppose that a database application is executing on a server device, and that this database application is used by a new employee onboarding service as well as a payroll service. Thus, if the server device is taken out of operation for maintenance, it is clear that the employee onboarding service and payroll service will be impacted. Likewise, the dependencies and relationships between configuration items may be able to represent the services impacted when a particular router fails.

In general, dependencies and relationships between configuration items may be displayed on a web-based interface and represented in a hierarchical fashion. Thus, adding, changing, or removing such dependencies and relationships may be accomplished by way of this interface.

Furthermore, users from managed network 300 may develop workflows that allow certain coordinated activities to take place across multiple discovered devices. For instance, an IT workflow might allow the user to change the common administrator password to all discovered LINUX® devices in single operation.

In order for discovery to take place in the manner described above, proxy servers 312, CMDB 500, and/or one or more credential stores may be configured with credentials for one or more of the devices to be discovered. Credentials may include any type of information needed in order to access the devices. These may include userid/password pairs, certificates, and so on. In some embodiments, these credentials may be stored in encrypted fields of CMDB 500. Proxy servers 312 may contain the decryption key for the credentials so that proxy servers 312 can use these credentials to log on to or otherwise access devices being discovered.

Figure 5B:
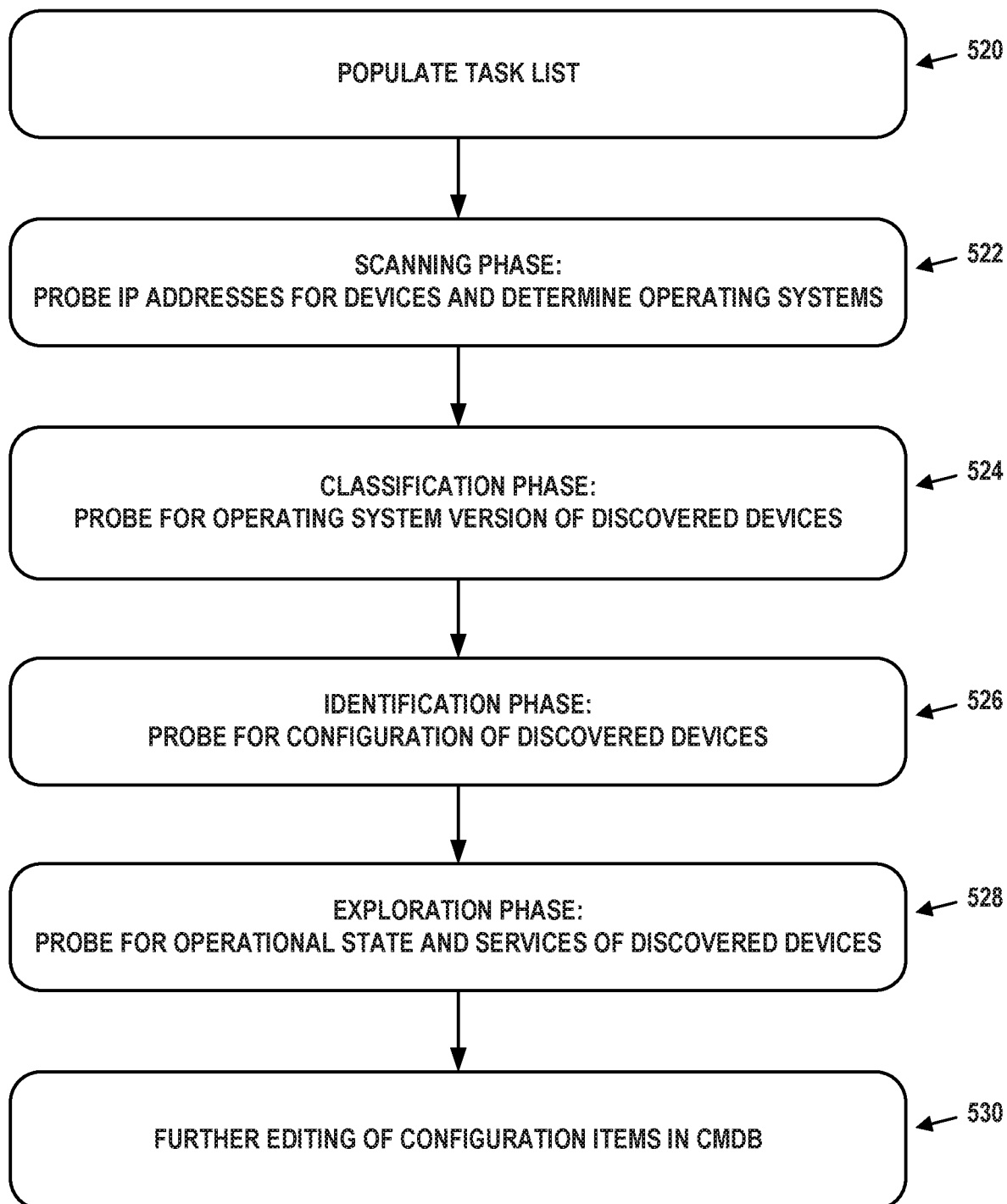
FIG. 5B is a flow chart, in accordance with example embodiments.

The discovery process is depicted as a flow chart in FIG. 5B. At block 520, the task list in the computational instance is populated, for instance, with a range of IP addresses. At block 522, the scanning phase takes place. Thus, the proxy servers probe the IP addresses for devices using these IP addresses, and attempt to determine the operating systems that are executing on these devices. At block 524, the classification phase takes place. The proxy servers attempt to determine the operating system version of the discovered devices. At block 526, the identification phase takes place. The proxy servers attempt to determine the hardware and/or software configuration of the discovered devices. At block 528, the exploration phase takes place. The proxy servers attempt to determine the operational state and applications executing on the discovered devices. At block 530, further editing of the configuration items representing the discovered devices and applications may take place. This editing may be automated and/or manual in nature.

The blocks represented in FIG. 5B are for purpose of example. Discovery may be a highly configurable procedure that can have more or fewer phases, and the operations of each phase may vary. In some cases, one or more phases may be customized, or may otherwise deviate from the exemplary descriptions above.

V. Discovery and Management of Internet of Things (IOT) Devices

The term Internet of Things (IOT) generally refers to discrete devices or device components, such as embedded controllers, sensors, actuators, software modules, or combinations thereof, that have Internet or IP connectivity and can be remotely accessed or controlled. Sometimes these devices are alternatively referred to as "smart" devices due to their ability to carry out simple or complex operations in response to commands or other input. Examples of IOT devices include, but are not limited to: learning thermostats, smart light switches and electrical outlets, online speakers, smart locks, medical monitoring devices, voice-controlled assistants, home or enterprise automation devices, biochip implants for livestock, temperature sensors, actuators for doors and other physical devices, remote-controlled cameras and microphones, motion sensors, and so on.

In some cases, IOT devices may be discovered and controlled in the manner discussed above. Namely, these devices may be discovered by a proxy server, probed for configuration and capabilities using an access protocol such as SSH or SNMP, and then remotely controlled or monitored by these or other protocols. But not all IOT devices support common access protocols. Some support only proprietary IP-based protocols, while others might not even connect directly to an IP network. Therefore, the discovery mechanisms described above might not be able to discover and manage many types of IOT devices.

In order to overcome this drawback, the embodiments herein use an edge gateway to facilitate communication with IOT devices on a network. The network may be an enterprise network, manufacturing or industrial network, agricultural network, home network, a bus-based network, a mesh network, a local area network, etc. The edge gateway serves a similar function as the proxy server described above, but has the ability to communicate to the IOT devices on the network in accordance with the protocols supported by these IOT devices. The edge gateway may also be able to receive program logic that contains routines or scripts that can be executed on the edge gateway so that orchestrations involving one or more IOT devices can be performed. Still, like the proxy server, the edge gateway may discover or be configured with descriptions, properties, and/or capabilities of the IOT devices on the network, and may provide representations thereof to a CMDB for storage as configuration items.

For example, consider a network that supports three IOT devices: device A, device B, and device C. Assume, for sake of example, that device A supports remote access via SNMP, while devices B and C only support respective proprietary protocols. Herein, a "proprietary protocol" may refer to a communication protocol owned or defined by a single organization or individual, which may also place restrictions on the use of the protocol and change the protocol unilaterally, among other possibilities. Proprietary protocols need not be maintained as secrets.

The edge gateway may be configured to interact with device A using SNMP, interact with device B using its proprietary protocol, and interact with device C using its proprietary protocol. The edge gateway may further receive, from a computational instance for example, program logic that causes the edge gateway to activate a particular function of device C when device A and device B are in respective particular states. Furthermore, this programmability may allow the edge gateway to carry out functions and/or interact with IOT devices even if the network is temporarily disconnected from the Internet or the remote network management platform.

Advantageously, this architecture expands the reach of the remote network management platform beyond that of management of enterprise networks. With the embodiments herein, the remote network management platform can be used to manage virtually any type of device on virtually any type of network, including non-standard devices and networks.

Thus, in order for the remote network management platform to administer the devices, applications, and services of a network, the remote network management platform may first determine what devices are present in the network, the configurations and operational statuses of these devices, and the applications and services provided by the devices (e.g., embedded controllers, sensors, actuators, software modules, or combinations thereof, whether they have Internet or IP connectivity and can be remotely accessed or controlled, etc.), as well as the relationships between discovered devices, applications, and services. But, as noted above, each device in the network may not be able to be accessed or assessed through use of conventional protocols. Thus, a process of communicating with, defining, and discovering devices within the network may be facilitated at least in part by an intermediary device (e.g., an edge gateway).

Notably, an edge gateway may be a computing device in accordance with computing device 100, with one or more network interfaces. Such an edge gateway may be placed on or associated with a managed network, and may be able to communicate with devices on the managed network as well as with a computational instance of a remote network management platform. In some cases, the edge gateway may support at least some router functionality. Alternatively, an edge gateway may be a deployable software module that can operate on a number of different device types.

Figure 6A:
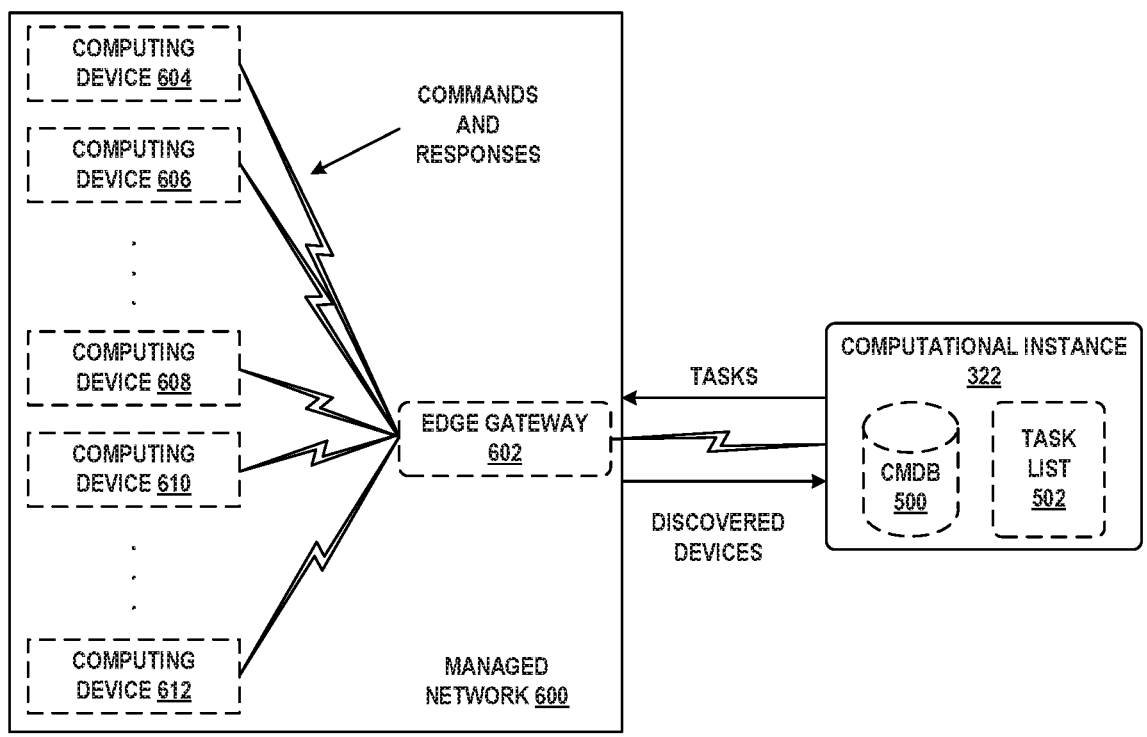
FIG. 6A depicts another communication environment involving a remote network management architecture, in accordance with example embodiments.

FIG. 6A provides a logical depiction of how devices on such a network can be discovered, as well as how information related to discovered devices can be stored. This type of discovery, however, might not encompass all of the steps and processes as described above in connection with proxy server 312. Instead, discovery in connection with an edge gateway may be quite different as different protocols may be used to allow or ensure that the edge gateway can connect and communicate with a host of devices, regardless of their individual attributes (e.g., use of proprietary IP-based protocols, limited or no connectivity to an IP network, etc.). The system in FIG. 6A contains computational instance 322, containing a database (labeled here as CMDB 500) and task list 502, in communication with edge gateway 602. Edge gateway may be part of managed network 600 and in communication with computing devices 604, 606, 608, 610, and 612. Furthermore, for sake of simplicity, remote network management platform 320, third-party networks 340, and Internet 350 are not shown.

Like FIG. 5A, in FIG. 6A CMDB 500 and task list 502 are stored within computational instance 322. Edge gateway 602 may retrieve and/or receive tasks from computational instance 322 and, in response, may transmit commands and/or queries to various devices in managed network 600. These devices may then transmit responses to edge gateway 602, and edge gateway 602 may then provide information regarding discovered devices to CMDB 500 for storage therein. This information may be presented to CMDB 500 (and computational instance 322, generally) in a fashion that CMDB 500 is configured to support, herein referred to as a digital representation. The digital representations may be stored in CMDB 500 as configuration items that represent the environment of managed network 600, which may also contain sub-environments or related devices (e.g., those used in a home, a car, a lawn, and so on, all of which operate on managed network 600).

Task list 502 represents a list of tasks that edge gateway 602 performs on behalf of computational instance 322 via the discovered devices. As devices are discovered, task list 502 may be populated. Edge gateway 602 then repeatedly queries task list 502, obtains the next task therein, and performs this task until task list 502 is empty or another stopping condition has been reached.

To facilitate this communication with discovered devices, edge gateway 602 may be configured to communicate to the devices on managed network 600 in accordance with the protocols supported by these devices. Alternatively, edge gateway 602 may also be able to receive program logic from remote network management platform 320 (e.g., as a task via task list 502) that contains routines or scripts that can be executed on edge gateway 602 so that the discovery of and orchestrations involving one or more devices can be performed. Additionally, similar to proxy server 312, edge gateway 602 may discover or be configured with descriptions, properties, and/or capabilities of the devices on managed network 600, and may provide representations thereof to a CMDB 500 for storage (e.g., as a configuration item).

Edge gateway 602 may also be designed and configured to have a small physical footprint. For instance, it may be if implemented as a containerized runtime application or software (e.g., using DOCKER®) on a small platform (e.g., RASPBERRY PI®) and/or be configured to allow itself to be embedded into other gateway offerings (e.g., an EDGEX FOUNDRY® gateway). Edge gateway 602, similar to proxy server 312, may also initiate communication sessions with the computational instance, which may improve enterprise security concerns and not require specific firewall configurations to allow unsolicited inbound communication from the computational instance. Instead, the computational instance can responsively communicate to the edge gateway, which will in turn communicate with the devices on the network, through an on-instance work queue similar to how proxy server 312 works and is described above.

FIG. 6A also depicts devices in managed network 600 as computing devices 604, 606, 608, 610, and 612. As noted above, these devices represent a set of physical and/or virtual devices (e.g., learning thermostats, smart light switches and electrical outlets, online speakers, smart locks, medical monitoring devices, voice-controlled assistants, home or enterprise automation devices, biochip implants for livestock, temperature sensors, actuators for doors and other physical devices, remote-controlled cameras and microphones, motion sensors, client devices, server devices, routers, or virtual machines, and so on), as well as devices that involve multiple individual devices (e.g., a network of multiple temperature sensors). The connectivity between edge gateway 602 and computing devices 604, 606, 608, 610, and 612 may be any form of wireline or wireless network, including Ethernet, Wifi, BLUETOOTH®, one or more communication busses, etc.

Placing the tasks in task list 502 may trigger or otherwise cause edge gateway 602 to begin discovering devices or update or adjust its ongoing device discovery efforts. Alternatively or additionally, device discovery may be manually triggered or automatically triggered based on triggering events (e.g., discovery may automatically begin once per day at a particular time or upon manual request).

In a further aspect, device discovery by edge gateway 602 may be based on local logic or protocols that do not require a trigger from other devices or the computational instance (e.g., the receipt of a task from task list 502). For example, edge gateway 602 may run local program logic (e.g., via an edge gateway software application) that discovers that one device on managed network 600 supports remote access via one or more standard protocols (e.g., SNMP), while another device does not. Without further instruction from other devices outside of managed network 600, edge gateway 602 may be able and configured to interact with both the first device (e.g., using SNMP) and the second device (e.g., using its proprietary protocol). In this respect, edge gateway 602 may carry out functions and/or interact with devices on managed network 600 even if the network is temporarily disconnected from computational instance 322 (or remote network management platform 320, third-party networks 340, or Internet 350).

Device discovery may also proceed in one or more phases, pursuant to one or more protocols. In a first example, as shown in FIG. 6A, edge gateway 602 may receive program logic via one or more tasks from computational instance 322 that contains routines or scripts that can be executed on edge gateway 602. These scripts or routines may cause edge gateway 602 to send commands to devices within managed network 600. These commands may request that the devices send their descriptions, properties, and/or capabilities back to edge gateway 602.

Such commands may lead to one or more shared protocols being established between edge gateway 602 and these devices, either directly (e.g., via an established or standardized protocol) or after some further resolution between the edge gateway and the devices (e.g., via a proprietary protocol with which the edge gateway is programmed to be able to communicate). In this way, edge gateway 602 can establish communication with any type of device on managed network 600, including non-standard devices operating under non-standard protocol.

As an example, suppose that computing device 604 supports standard TCP and/or UDP IP communication, but does not support communication or control via conventional access protocols, such as SNMP or SSH. During discovery, edge gateway 602 (or a proxy server not shown) may determine that a TCP port X is open on computing device 604. With this information, edge gateway 602 may determine that it may be able to communicate with computing device 604 by way of a proprietary protocol that uses port X because program logic for this protocol has been installed on edge gateway 602. Alternatively, edge gateway 602 may request such program logic from computational instance 322 by specifying port X, for example. Computational instance 322 may transmit the requested program logic to edge gateway 602, and the latter may install, execute, and use the program logic to attempt to access computing device 604. In a further aspect, computational instance 322 may also (e.g., in CMDB 500) mappings between TCP or UDP ports and sets of program logic. In this way, computational instance 322 may select a set of program logic by finding a mapping from the open TCP or UDP port on the particular computing device to the set of program logic Once such a path of communication is established, edge gateway 602 may elicit information from one or more of computing devices on managed network 600 (shown here as 604, 606, 608, 610, and 612). In this phase, edge gateway 602 may send queries to and receive responses from the devices on managed network 600 to determine specific details about one or more of the devices on the network. For example, during this communication, edge gateway 602 may determine that computing device 604 has one set of attributes (e.g., a door actuator that has two controllable states, fully extended and fully retracted, and communicates via SNMP), while computing device 606 has another set of attributes (e.g., a home stereo speaker that can stream music via an established network, but can only be communicated with via a proprietary protocol). By determining these attributes of devices on managed network 600, edge gateway 602 can determine how it should communicate with these devices and any further information it may elicit moving forward (e.g., whether the door is open or closed, whether music is playing via the home stereo speaker, as well as what type of music and at what volume, and so on). Either way, the information edge gateway 602 receives from the devices on managed network 600 may facilitate further actions by the edge gateway.

In one scenario, edge gateway 602, pursuant to one or more local programs or logic, may command and manage the devices locally within managed network 600 without further input from computational instance 322 (e.g., if the music playing from a home stereo speaker is playing above a predetermined volume, the edge gateway causes a door actuator to fully retract and close the door). But, this orchestration of devices on managed network 600 can also be based on local programs or logic that may be updated periodically and/or dynamically based on the state and capabilities of the individual devices (e.g., the home stereo speaker is overheating when operating above a predetermined volume), or the sub-environment, environment, or network in which they are operating, and via one or more protocols (e.g., the edge gateway receives an updated task from task list 502, another device is added to managed network 600, etc.). Under any of these scenarios, edge gateway may also be configured to convert this information to be uploaded and understood by another entity.

For example, edge gateway 602 may elicit and gather information from devices on managed network 600, all of which may have different attributes and communicate via various proprietary protocols, and simply want to report that information about the discovered devices upstream to computational instance 322 (e.g., so that this information may be stored in CMDB 500). To do this, edge gateway may utilize one or more protocols to ensure the uniformity of the reported information, and its compliance with protocol it may establish (or may have established) with computational instance 322. In this way, edge gateway 602 may pass details about or communications from the devices in managed network 600 to computational instance 322. To do so, edge gateway 602 may need to perform one or more protocol translations to convert a variety of standard and non-standard machine languages and/or communication protocols that computational instance 322 does not support before passing communications to the computational instance (e.g., convert Message Queuing Telemetry Transport (MQTT) to Hypertext Transfer Protocol (HTTP)).

For example, assuming that all discovered devices on managed network 600 are physical objects (e.g., learning thermostats, smart light switches and electrical outlets, online speakers, smart locks, medical monitoring devices, voice-controlled assistants, temperature sensors, actuators for doors and other physical devices, remote-controlled cameras and microphones, motion sensors, etc.), edge gateway 602 may model the attributes of these objects (e.g., state and capabilities) before reporting to computational instance 322. By converting data and information that may be received from the devices on managed network 600 in a variety of formats and protocols to a format or protocol readily and uniformly understood by computational instance 322, the computational instance may receive data that it is configured to support, which is also organized and batched in a manner also supporting the computational instance.

To do so, edge gateway 602 may run a local program to aggregate gathered information on the discovered devices and create digital representations of these devices. In a further aspect, edge gateway 602 may adjust the granularity of the digital representation and the information that is considered in creating that digital representation (e.g., the attributes and capabilities of the discovered device, such as what sensor data can be obtained and/or current sensor data, whether it can call web APIs and/or if it currently doing so, etc.). In this way, the digital representation may act as a stand in for the physical objects (devices) in managed network 600 to associate sensors and their readings, track and query status, determine ability to take action on the devices and understand how those devices relate to other devices in the network.

This digital representation may also contain code or other digital language and constructs indicating properties that represent the status of the physical object, understandings of how to determine a device's state based on values of its properties and/or other devices related to it, capabilities of the device that describe what it can do (e.g., actuate a device's components and/or sensors, call web APIs, publish messages, communicate with other devices to determine their capabilities, etc.), and so on. Thus, this digital representation of one or more devices on managed network 600 may be derived by edge gateway 602 from sensors, actuators, and inputs on the devices, web APIs (in the cloud, on managed network 600, or otherwise), values calculated by edge gateway 602 based on this information, and other digital representations that edge gateway 602 has created in the past, among other possibilities. The creation of this digital representation may be based on one or more protocols (e.g., event driven state based action determination and specification defined either in script or in a decision table), and result in one or more formats (e.g., JavaScript Object Representation). Based on limited re-engagement with the devices on the network, particularly after an initial discovery of the device (e.g., ongoing digital representations may also be based on querying via Representational State Transfer (REST) API (e.g., defining a set of constraints and properties based on HTTP) and/or other APIs to determine last known state of the device without having to go query each of the known sensors on the device).

Regardless, this digital representations model may serve as a construct of the physical discovered devices that exists digitally and may be used to model the properties and capabilities of the discovered devices in managed network 600 so that they can be represented, controlled, and interacted with at the local edge gateway level, as well as upstream at the computational instance level (and/or the remote network management platform level).

Once edge gateway 602 has gathered and converted the data received from the devices on managed network 600, it may further organize and batch the data before sending it to computational instance 322. For example, edge gateway 602 may determine that computing devices 604 and 606 relate to computing devices used for a home (e.g., a door actuator and home stereo speaker, respectively), while computing devices 608 and 610 relate to devices used in a car (e.g., an ignition switch and speedometer, respectively) and computing device 612 is a lawn management device (e.g., a sprinkler system). In this scenario, edge gateway 602 could gather and convert all of the information gained from the devices on managed network 600 to digital representations pursuant to a protocol or format computational instance 322 is configured to support, and then send that information, piecewise, to the computational instance as soon as it is prepared.

However, edge gateway 602 could also organize the received information, or any digital representation based on that information, before sending it to computational instance 322. In one example, edge gateway 602 may gather all of the information from computing devices 604, 606, 608, 610, and 612, and then organize that information based on a local protocol that allows sorting of related information before conversion to a digital representation the computational instance is configured to support. At a low level of granularity, edge gateway 602 could receive data from the devices on managed network 600, realize that each device is unique (both in its state and capabilities), create a digital representation for each, and then send them individually based on one or more predetermined protocols (e.g., at different periodic intervals, based on different thresholds of received information, etc.). At a slightly higher level of granularity, edge gateway 602 could receive data from the devices on managed network 600, realize that while each device is unique (both in its state and capabilities), some are related in the sub-environments in which they operate (e.g., computing devices 604 and 606 are home devices, computing devices 608 and 610 are car devices, and computing device 612 is a lawn management device). In response, edge gateway 602 could instead create a digital representation for the devices operating in each sub-environment, and then send them individually based on one or more predetermined protocols (e.g., send home device batches every 10 mins and lawn management batches every hour).

Alternatively or additionally, edge gateway 602 may gather the information from computing devices 604, 606, 608, 610, and 612, convert it all to a digital representation that computational instance 322 is configured to support, and then organize the digital representations based on a local protocol before sending the data to computational instance 322. For example, edge gateway 602 could receive data from the devices on managed network 600, create digital representations for each (e.g., based on each device's state and capabilities), and then send them individually based on one or more predetermined protocols. In one example, these digital representations could be sent to computational instance 322 at predetermined periodic intervals (e.g., batch all digital representations created for devices on managed network 600 over 30-second intervals and then send them to the computational instance). In another example, the digital representations could be sent to computational instance 322 based on different thresholds of received information (e.g., only send digital representation of computing device 608 (an ignition switch) when the device is engaged).

At a slightly higher-level of granularity, edge gateway 602 could receive data from the devices on managed network 600, convert it to a digital representation that computational instance 322 is configured to support, realize that some of the devices are related in the environments in which they operate (e.g., computing devices 604 and 606 are home devices, computing devices 608 and 610 are car devices, and computing device 612 is a lawn management device), and create a digital representation for each environment. Then, edge gateway 602 could send the digital representations of the devices and/or the environments based on one or more predetermined protocols (e.g., periodically, with digital representations of home devices and/or the home environment sent more frequently than those of the lawn management device).

Furthermore, these protocols for sending digital representations for the devices on managed network 600 to computational instance 322 may change over time. For example, edge gateway 602 may gather and convert at least some of the information it can obtain about the devices on managed network 600 and then send digital representations for each device (e.g., state and capabilities) to computational instance 322 for storage in CMDB 500. By doing so, CMDB may have an initial snapshot representation of all the devices (and their individual states and capabilities) at that given moment. Then, in a second example, once CMDB 500 has a stored list of the states and capabilities of the devices in managed network 600, edge gateway 602 may send further digital representations of devices in managed network 600 if something changes within the network (e.g., if the state or capability of any individual device changes, if a device is added to the network, and so on). In this way, edge gateway 602 may do limited transformation and/or reporting on communications received from devices on managed network 600 in order to filter data to be sent to computational instance 322 for situations where not all the information in the communication is meaningful to be collected in the computational instance (e.g., a sensor value has not changed, so there is no need to send it to server again).

Under any of these scenarios, however, organizing and batching the information and/or digital representations created by edge gateway 602 before sending digital representations to computational instance 322 allows edge gateway 602 to both effectively manage the devices within the network locally, as well as deliver digital representations of those devices to the computational instance under protocol the computational instance finds most useful. And, of course, this process may progress iteratively or recursively.

In a further aspect, once CMDB 500 has received digital representations of the devices in managed network 600, further tasks may be created for task list 502 (or tasks within task list 502 may be updated) in response to these digital representations. These updated tasks in task list 502 may also trigger or otherwise cause edge gateway 602 to update or adjust its ongoing device discovery efforts and/or adjust its local program logic used to manage or communicate with those devices (running, e.g., via an edge gateway software application). In some cases, because some devices on managed network 600 may be discovered and controlled in the manner discussed above (e.g., by a proxy server, probed for configuration and capabilities using an access protocol such as SSH or SNMP, and then remotely controlled or monitored by these protocols), the iterative nature of this discovery, reporting digital representations thereof, and receiving updated tasks based on that reporting, may be fairly fluid and uninterrupted.

However, because not all devices on managed network 600 may support common access protocols (e.g., support only proprietary IP-based protocols, are not even connect directly to an IP network, etc.), some of the discovery mechanisms described above might not be able to automatically discover and manage these types of devices on the network. For example, edge gateway 602 could discover a device on managed network 600 that it realizes is present on the network, but is not configured to communicate with (e.g., the device uses a proprietary protocol that edge gateway 602 is not configured to communicate by way of). Edge gateway 602 may create what limited digital representation it can of the partially discovered device (e.g., a digital representation that indicates the presence of the device on the network, but not its state or capabilities) and send that digital representation to computational instance for storage on CMDB 500. Then, once received and stored, computational instance 322 could create a new task for task list 502 that contains program logic for effectively communicating with the partially discovered device, which triggers or otherwise causes edge gateway 602 to update its local programs or logic, and begin communicating with the device in a more robust way (e.g., by communicating with it under its proprietary protocol and discovering the state and capabilities of the device). In this respect, edge gateway 602 may carry out functions and/or interact with devices on managed network 600 that may not otherwise be possible for computational instance 322.

As noted above, edge gateway 602 may carry out a standard probing protocol for devices on managed network 600 that includes probing each IP address in the specified range of IP addresses for open TCP and/or UDP ports to determine the general type of device and the edge gateway's ability to communicate with that type of device. Moreover, the presence of such open TCP ports at an IP address may indicate that a particular application is operating on the device that is assigned the IP address, which in turn may identify the operating system used by the device. In this way, edge gateway 602 may determine that a particular computing device is disposed upon the managed network by probing a range of Internet Protocol (IP) addresses of the managed network for devices configured with IP addresses within a specified range.

For example, during this probing, edge gateway 602 may determine that TCP port 135 is open on computing device 604. Further, edge gateway 602 may attempt to probe the particular computing device by way of each of the one or more specific standard communication protocols, but determine that the probes have failed to access the particular computing device. Although edge gateway 602 may not be configured to perform the correct communication protocol based on that open port on computing device 604, or be configured to communicate with the computing device generally, edge gateway 602 may nevertheless create what limited digital representation it can of the partially discovered device (e.g., a digital representation that indicates TCP port 135 is open on computing device 604, but not the device's state or capabilities) and send that digital representation to computational instance for storage on CMDB 500.

Then, once computational instance 322 receives and stores the digital representation, computational instance 322 may be configured to recognize that an open TCP port 135 on the computing device indicates that the device is likely executing a WINDOWS® operating system. Accordingly, computational instance 322 could create a new task for task list 502 that contains program logic for effectively communicating with the WINDOWS® operating system on computing device 604. Furthermore, as described above, the retrieval of this task by edge gateway 602 may trigger the edge gateway to update its local programs or logic to be able to recognize and communicate with devices running WINDOWS® operating system, and begin communicating with computing device 604 in a more robust way (e.g., by communicating with it under WINDOWS® protocol and discovering the state and capabilities of the device).

Furthermore, CMDB 500 may include entries regarding dependencies and relationships between the devices on managed network 600. More specifically, a device operating in a particular environment, as well as the devices that may rely on or communicate with this device in that environment, may be represented as such in CMDB 500. For instance, suppose that a user is driving a car with computing devices 608 and 610 (e.g., an ignition switch and speedometer, respectively). Thus, if computing device 608 is taken out of operation for maintenance (e.g., the ignition switch is removed for repair), it is clear that computing device 610 will be impacted (e.g., become non-functional when the car cannot start without the ignition switch).

Once device discovery on managed network 600 is completed (or is at some sufficient iteration), a snapshot representation of each discovered device and its attributes (e.g., state and capabilities) may be available in CMDB 500. This collected information may be presented to a user in various ways to allow the user to view the compositions and operational statuses of the devices on managed network 600, as well as the characteristics of environments that may contain multiple devices within the network.

In general, dependencies and relationships between devices may be displayed on a web-based interface and represented in a hierarchical fashion (e.g., via a GUI). Thus, adding, changing, or removing such dependencies and relationships may be accomplished by way of this interface. For example, a dedicated user interface may be created based on the digital representations of the devices in managed network 600. In this way, the user interface may inspect and adjust the granularity of the digital representation in ways that are meaningful to the user (e.g., define the properties of any given device or environment, as their capabilities and/or dependencies on other devices and/or environments), without having to navigate multiple user interfaces. Alternatively, because a user's interaction with user interface can often be complex and/or error-prone, a more logical or guided user interface (e.g., a series of GUI widgets that provide logical workflow may) be presented that is likely to operate with fewer errors.

Further, this user interface may allow a user to specify a visual representation of the device or component the user would like to control or monitor in managed network 600 (or perhaps an environment thereof). In other words, the user should be able to design and interact with the user interface in a way that does not require specific technical expertise (e.g., that of a data scientist) to understand and work with the devices of network at a level of granularity they so choose. For example, if the environment within managed network 600 the user wants to interact is a car with computing devices 608, an ignition switch, and 610, a speedometer, then visual representation of that environment via the user interface would show the visual of the aspects of a car and the sensors associated with it (e.g., an ignition switch, as an image of an illuminated or non-illuminated ignition button), rather than as a flat data stream coming from the car (e.g., ignition_switch_sensor_on). This example should not be read as limiting, however, as the user interface may be used to present a host of metrics and that allows the user to choose which are the most important for their individual experience with the user interface (e.g., properties, capabilities, and/or state of device, sensors that are attached to and/or associated with the device, REST APIs that can be used to interact with the device, a visual representation of the device via the user interface, the relationships of the device to other devices on the network and otherwise, and so on).

Furthermore, users from managed network 600 may develop workflows that allow certain coordinated activities to take place across multiple discovered devices and control those workflows from the user interface. For instance, a user may want all devices in managed network 600 to power off until further input from the user. A user may also want to control an individual device on the network (e.g., increase the volume of playback from a home stereo speaker). Other examples are possible.

Figure 6B:
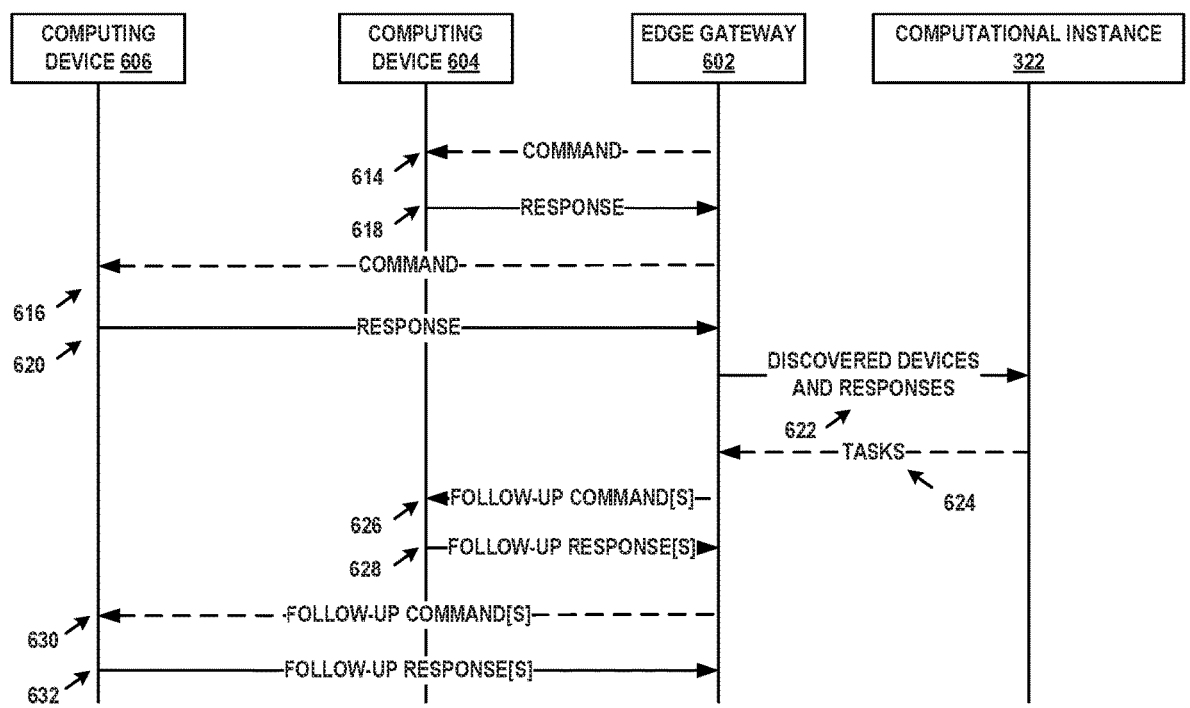
FIG. 6B is a message flow diagram, in accordance with example embodiments.

FIG. 6B is a message flow diagram further illustrating an example embodiment. The process illustrated by FIG. 6B may be carried out by one or more computing devices, such as computing device 100, and/or a cluster of computing devices, such as server cluster 200.

FIG. 6B provides an example signal flow for computing devices 604 and 606 and edge gateway 602 operating in a given network, with the edge gateway in further communication with computational instance 322. The embodiments of FIG. 6B may be simplified by the removal of either of the devices shown therein. Further, these embodiments may be combined with features, aspects, and/or implementations of any of the previous figures or otherwise described herein.

In this example, as illustrated in FIG. 6B, edge gateway 602 may be running a local program or logic (e.g., via an edge gateway software application) that facilitates device discovery within a specific network. For example, edge gateway 602 may detect that computing devices 604 and 606 are present on a specific network. In response, edge gateway 602 may generate a command to each device to send a list of each device's state and capabilities, shown here as commands 614 and 616 for computing devices 604 and 606, respectively. Although these commands are discussed here as contemporaneous, they may be separated in time or pursuant to variety of individualized protocols.

Either way, responsive to sending commands 614 and 616, edge gateway 602 may receive responses from computing devices 604 and 606, shown here as responses 618 and 620, respectively. These responses may indicate the discreteness of computing devices 604 and 606, the components making up each device (e.g., embedded controllers, sensors, actuators, software modules, or combinations thereof), the Internet or IP connectivity of each device, the preferred communication protocol for each device (e.g., proprietary or otherwise), whether each device can be remotely accessed or controlled, and so on. In some cases, these devices' configurations and capabilities may be discovered by a standardized protocol (probed via an access protocol such as SSH or SNMP), and then remotely controlled or monitored by the same protocol. In other cases, however, it may not be so simple. The following example scenario, as also explained in the context of FIG. 6B, helps illustrate the ability of the edge gateway and computational instance 322 to dynamically respond to and control both of these types of devices on the network.

Specifically, in an example embodiment, response 618 from computing device 604 may contain information that is both helpful to edge gateway 602 in managing the device on the network and in a language the edge gateway is configured to support (e.g., a list of components that may be measured and controlled in computing device 604 via an SNMP protocol with the edge gateway). Conversely, response 620 from computing device 606 may contain information that may not be as helpful to edge gateway 602 (e.g., a message indicating computing device 606 can only communicate via a proprietary IP-based protocol, through which edge gateway 602 is not configured to communicate). Thus, without any further input, edge gateway 602 may determine that it can interact with and/or manage computing device 604 under one or more local programs or logic, but cannot do so to the same extent with computing device 606 (as a partially discovered device).

Regardless, edge gateway 602 may convert the information it received in response 618, and to a lesser extent response 620, into information that is well understood by and potentially useful for computational instance 322. Specifically, edge gateway may gather, convert, and batch this information into digital representations of these two scenarios (i.e., digital representations of a well-understood and well-defined computing device 604 versus the ill-understood and ill-defined computing device 606), a composite digital representation of the two scenarios, or some other digital representation, and then send those digital representations to computational instance 322 via an established protocol 622 (here, labeled "Discovered Devices and Responses").

Then, in response, computational instance 322 may store the information contained in these digital representations. In a further aspect, however, based on the receipt and its analysis of the information contained in these digital representations, computational instance 322 may also generate new tasks to be queued in an associated task list and/or update existing tasks in that task list. In this example, tasks may be created based on the information contained in the received digital representations, which is indicative of the information contained in responses 618 and 620.

Concerning response 618, computational instance 322 may generate a task for edge gateway 602 to engage a specific component of computing device 604 at a specific time, using a specific communication protocol, and then place that task in a task list with which edge gateway 602 routinely (e.g., periodically) communicates. Concerning response 620, realizing that edge gateway 602 is not configured to communicate via the proprietary protocol communicated with computing device 606, computational instance may generate a task for edge gateway 602 containing a new local program or logic to run on edge gateway 602, an update to the existing local programs or logic running on edge gateway 602, or both, that allows edge gateway 602 to become configured to communicate with computing device 606. The computational instance may then place that task in the same task list as above. Then, the next time edge gateway 602 interacts with computational instance 322, it may receive and/or retrieve these tasks 624 (illustrated here as "Tasks").

Once edge gateway 602 receives these tasks, it may take responsive actions and send follow-up commands 626 and 630, to computing devices 604 and 606, respectively. Concerning follow-up command 626, edge gateway 602 may convert the information contained in the task from computational instance 322 into the protocol it knows computing device 604 is configured to support (i.e., the established, specific communication protocol it has with computing device 604). Then, once converted, edge gateway 602 may command computing device 604 to engage a specific component at a specific time. Edge gateway 602 may also perform follow-up management (e.g., observation and control) of computing device 604, based on local programs or logic, updated tasks from the computational instance, or other factors, and receive one or more follow-up responses 628 to the same.

Concerning follow-up command 630, edge gateway 602 may convert the information contained in the task from the computational instance into the protocol it knows how to implement (e.g., an executable file or code containing a new local program or logic to run on the edge gateway via an edge gateway software application, an update to the existing local programs or logic running on the edge gateway, or both) that allows the edge gateway to be configured to communicate with computing device 606 (e.g., via the proprietary protocol of computing device 606). Then, once edge gateway 602 can effectively communicate with computing device 606, it may send a follow-up command 630 command to computing device 606 to send a list of its state and capabilities, that, here, computing device 606 may understand for the first time. Then, in response, edge gateway 602 may receive a follow-up response 632 containing information that is both helpful to edge gateway 602 in managing computing device 606 on the network and in a language the edge gateway is configured to support (e.g., a list of components that may be measured and controlled in computing device 606 via its proprietary protocol with the edge gateway).

These examples explained in connection with FIG. 6B are for purpose of example only. Device discovery, as detailed above in connection with at least FIG. 6A and below in connection with FIGS. 7A-9, may be a highly configurable procedure that can have more or fewer steps, iterations, and protocols, and the operations of each in connection with any number of devices on a specified network may vary.

In but some examples, the entire managed network 600, as well as edge gateway 602 and all of the devices thereunder (computing devices 604, 606, 608, 610, and 612) could be implemented in connection with or as a part of managed network 300 in FIG. 5A (e.g., as a configuration item). Thus, because in some cases, the steps, iterations, and protocol shown in FIGS. 6A and 6B may vary and may be customized, or may otherwise deviate from the exemplary descriptions above, they should be well understood herein as examples only.

VI. Specific Example Embodiments of Discovery and Management of IOT Devices

FIG. 7 depicts a refrigeration system 700 that includes an integrated edge gateway 702, a first refrigeration unit that has a refrigerator portion with left door actuator 704, a right door actuator 706, and an internal temperature sensor 708, and a deep-freeze portion with a drawer actuator 710 and an internal temperature sensor 712, a second refrigeration unit that has a refrigerator portion with left door actuator 714, a right door actuator 716, and an internal temperature sensor 718, and a deep-freeze portion with a drawer actuator 720 and an internal temperature sensor 722, and a third refrigeration unit that has a refrigerator portion with left door actuator 724, a right door actuator 726, and an internal temperature sensor 728, and a deep-freeze portion with a drawer actuator 730 and an internal temperature sensor 732. Here, edge gateway 702 and some or all of the sensors and actuators in the refrigerator system 700 operate on a network (e.g., like managed network 600 in FIG. 6A).

In this system, edge gateway 702, although not specifically illustrated as such, is also in communication with a computational instance (e.g., as illustrated in FIG. 6A at 322), or a proxy server in communication with a computational instance (e.g., as illustrated in FIG. 5A at 302 and 322, respectively). Either way, edge gateway 702 may discover the states and capabilities of the sensors and actuators in the refrigerator system 700 via a standardized or proprietary protocol, as further detailed above.

Assuming edge gateway 702 discovers the states and capabilities of these sensors and devices in refrigerator system 700, edge gateway 702 may control the sensors and actuators in refrigeration system 700 based on an established local program or logic, with one more predefined operational parameters (e.g., if the internal temperature sensor 708 of the refrigerator in the first refrigeration unit shows a temperature of over 40 degrees Fahrenheit, command the left and right doors of the refrigerator to close using actuators 704 and 706). Further, this orchestration of the sensors and actuators in refrigeration system 700 based on local programs or logic that may be updated periodically and/or dynamically based on the state and capabilities of the individual devices, or the sub-environment, environment, or network in which they are operating, and via one or more protocols (e.g., the first, second, or third refrigeration units, etc.). Alternatively or additionally, this orchestration could be based on programs or logic stored elsewhere (e.g., on computational instance 322).

With this discovered information of the states and capabilities of these sensors and actuators in refrigerator system 700, however, the edge gateway may also convert this information into one or more digital representations to communicate to the computational instance in a language and with a protocol that the computational instance is configured to support.

In one example, edge gateway 702 may convert the discovered information of the states and capabilities of these sensors and devices in the refrigerator system into digital representations of the same and send them to computational instance 322 for further storage and analysis (e.g., via the CMDB 500 and/or task list 502). As detailed above, once edge gateway 702 has gathered and converted the data received from the devices in refrigerator system 700, it may further organize and batch the data before sending it to computational instance 322. And, as also described above, the detail and granularity of these digital representations can be adjusted based on requests by the computational instance (e.g., based on workflows defined for the refrigerator system), the user (e.g., based on the user's selection of the most meaningful representation of refrigerator system 700 via a user interface), or other such conditions. Accordingly, this process may progress iteratively or recursively. Under any of these scenarios, however, organizing and batching the information and/or digital representations created by edge gateway 702 before sending digital representations to computational instance 322 allows edge gateway 702 to both effectively manage the devices of refrigerator system 700 locally, as well as deliver digital representations of those devices to the computational instance using protocol computational instance 322 supports.

In a further aspect, additional tasks may be created or provided by computational instance 322 in response to these digital representations. For instance, computational instance 322 may create a task that deals with a specific component of a specific refrigeration unit in refrigeration system 700 (e.g., a task that causes edge gateway 702 to command left door actuator 704 to retract and close the door). In another example, computational instance 322, based on the received digital representations, may create a task that introduces a new local program or logic to be implemented by the edge gateway (e.g., logic that is executed by an edge gateway software application and causes any of the deep-freeze drawer actuators 710, 720, 730 to open the respective drawer if any of the respective deep-freeze internal temperature sensors 712, 722, 732 observe a temperature below a certain threshold).

Like other example embodiments illustrated herein, the computational instance may also catalog and analyze information contained in the digital representations regarding dependencies and relationships between the devices in refrigeration system 700, and these dependencies and relationships may be displayed on a web-based interface and/or represented in a hierarchical fashion. Thus, like other systems discussed herein, adding, changing, or removing such dependencies and relationships may be accomplished by way of an intuitive user interface.

Figure 7A:
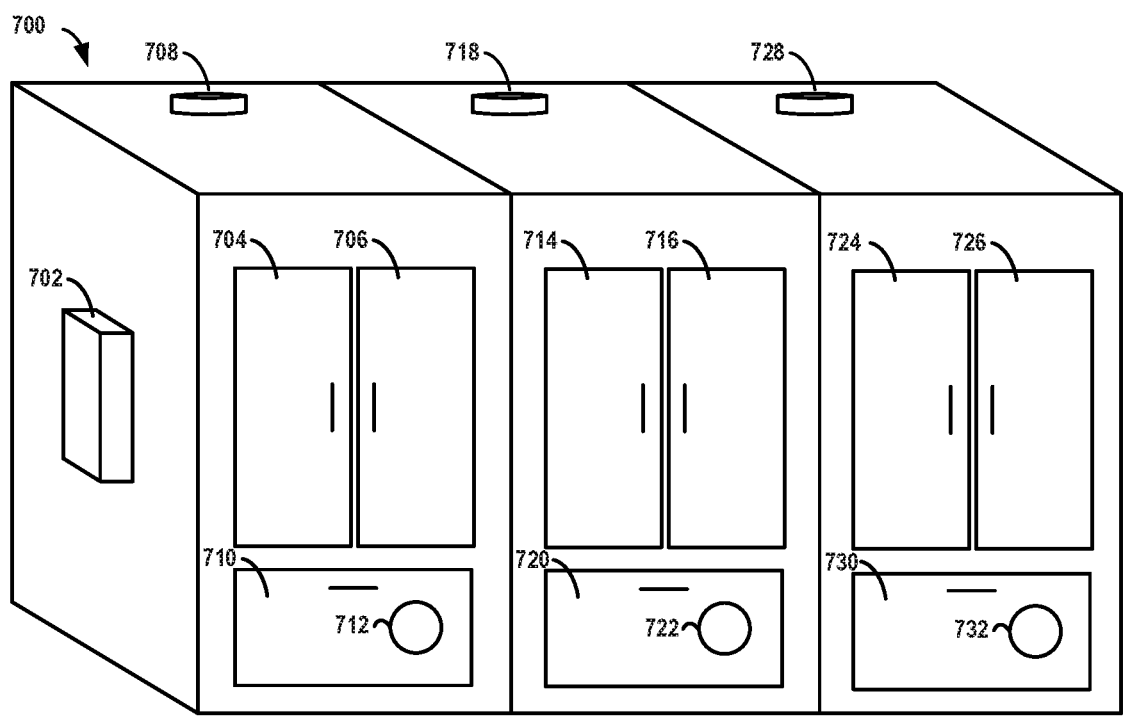
FIG. 7A depicts another communication environment involving a remote network management architecture including a refrigeration system, in accordance with example embodiments.
Figure 7B:
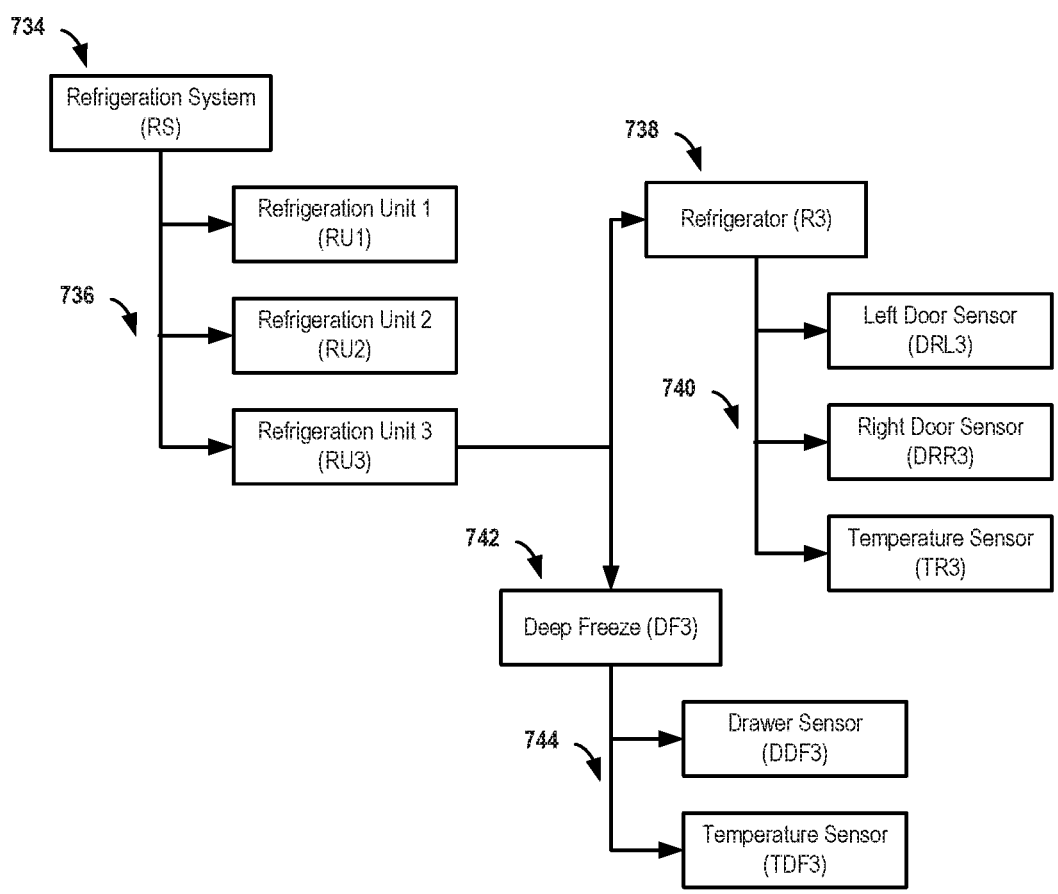
FIG. 7B depicts an example compositional view of a refrigeration system, in accordance with example embodiments.

FIG. 7B depicts an example compositional view of a communication environment involving a remote network management architecture including refrigeration system 700. Specifically, FIG. 7B depicts a compositional view of refrigeration system 700, shown in FIG. 7B as Refrigeration System (RS) 734, which receives sensor and actuator data 736 from Refrigeration Unit 1 (RU1), Refrigeration Unit 2 (RU2), and Refrigeration Unit 3 (RU3). This data for each of RU1, RU2, and RU3 is received from one or more sensors and actuators making up RU1, RU2, and RU3. For example, looking to RU3, there is a refrigerator portion, Refrigerator (R3) 738, which receives sensor and actuator data 740 from Left Door Sensor (DRL3), Right Door Sensor (DRR3), and Temperature Sensor (TR3), and a deep-freeze portion, Deep Freeze (DF3) 742, which receives sensor and actuator data 744 from Drawer Sensor (DDF3) and Temperature Sensor (TDF3).

Figure 7C:
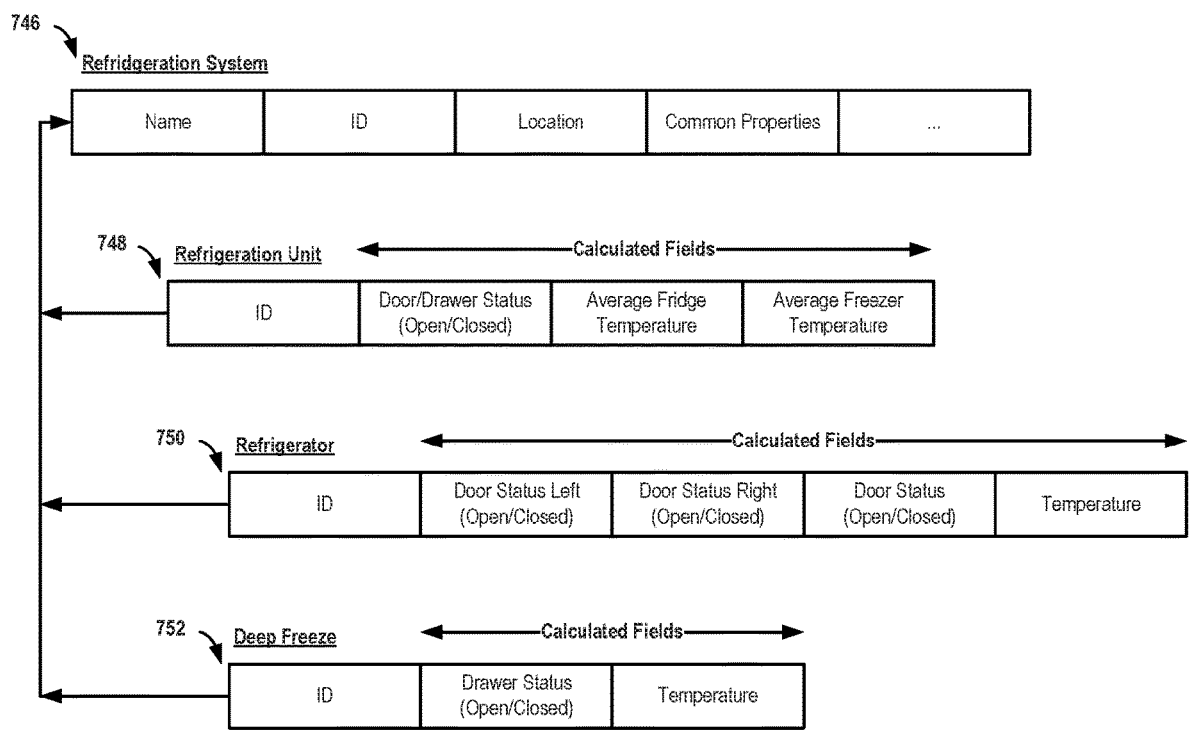
FIG. 7C depicts an example state representation of a refrigeration system, in accordance with example embodiments.

FIG. 7C depicts an example state representation of a communication environment involving a remote network management architecture including refrigeration system 700. Specifically, FIG. 7C depicts an example state representation based on processing information received from the sensors and actuators in refrigeration system 700 (such as that illustrated in compositional view of the refrigeration system shown in FIG. 7B). In FIG. 7C, an example state representation 746 is provided for a refrigeration system (e.g., as shown in FIG. 7B) that includes indicators for a variety of metrics (shown here as "Name," "ID," "Location," "Common Properties," and so on (shown here as " . . . ")). Contributing to the metrics for the refrigeration system in FIG. 7C is data from each of the refrigeration units (e.g., RU1, RU2, and RU3 in FIG. 7B), shown here as example state representation 748 that includes indicators for a variety of metrics (shown here as "ID"), as well as calculated fields (shown here as "Door/Drawer Status (Open/Closed)," "Average Fridge Temperature," and "Average Freezer Temperature").

Also contributing to the metrics for the refrigeration system in FIG. 7C is data from each of the sensors and actuators in the refrigeration units, including those in the refrigerator portion, shown here as example state representation 750 that includes indicators for a variety of metrics (shown here as "ID"), as well as calculated fields (shown here as "Door Status Left (Open/Closed)," "Door Status Right (Open/Closed)," "Door Status (Open/Closed)," and "Temperature"), as well as those in the deep-freeze portion, shown here as example state representation 752 that includes indicators for a variety of metrics (shown here as "ID"), as well as calculated fields (shown here as "Drawer Status (Open/Closed)" and "Temperature").

Figure 7D:
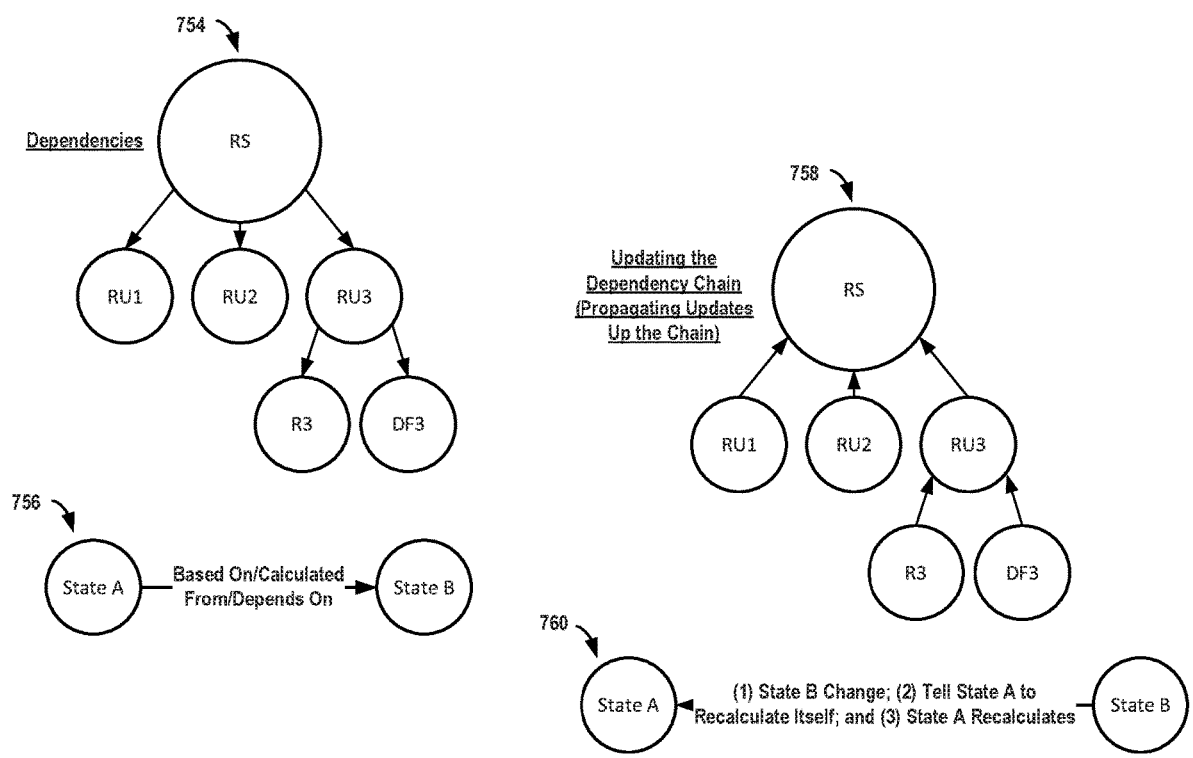
FIG. 7D depicts an example dependency architecture representation of a refrigeration system, in accordance with example embodiments.

FIG. 7D depicts an example dependency architecture representation of a communication environment involving a remote network management architecture including refrigeration system 700, in accordance with example embodiments. Specifically, FIG. 7D depicts a dependency architecture 754 of refrigeration system 700, which illustrates that the data modeling and processing that occurs in connection with a Refrigeration System (RS) depends on data received from Refrigeration Unit 1 (RU1), Refrigeration Unit 2 (RU2), and Refrigeration Unit 3 (RU3), each of which depends on data received from its individual one or more sensors and actuators, shown here as a refrigerator portion, Refrigerator (R3), and a deep-freeze portion, Deep Freeze (DF3). In this way, as shown at state representation 756, the "state" (e.g., a summary or model) of any higher portion of the refrigeration system (shown here as "State A") is based on, calculated from, or depends on the "state" of one or more components below it on the dependency architecture (shown here as "State B").

In this way, as illustrated at state representation 758, the "state" of the components of the dependency architecture may be updated whenever the "state" of one or more components below it on the dependency architecture are updated. In this way, as shown in state representation 760, as the "state" of any one or more components that are lower on the dependency architecture (shown here as "State B") change, one (or more) of the higher portions of the refrigeration system (shown here as "State A") are told to recalculate itself and will do so.

Figure 7E:
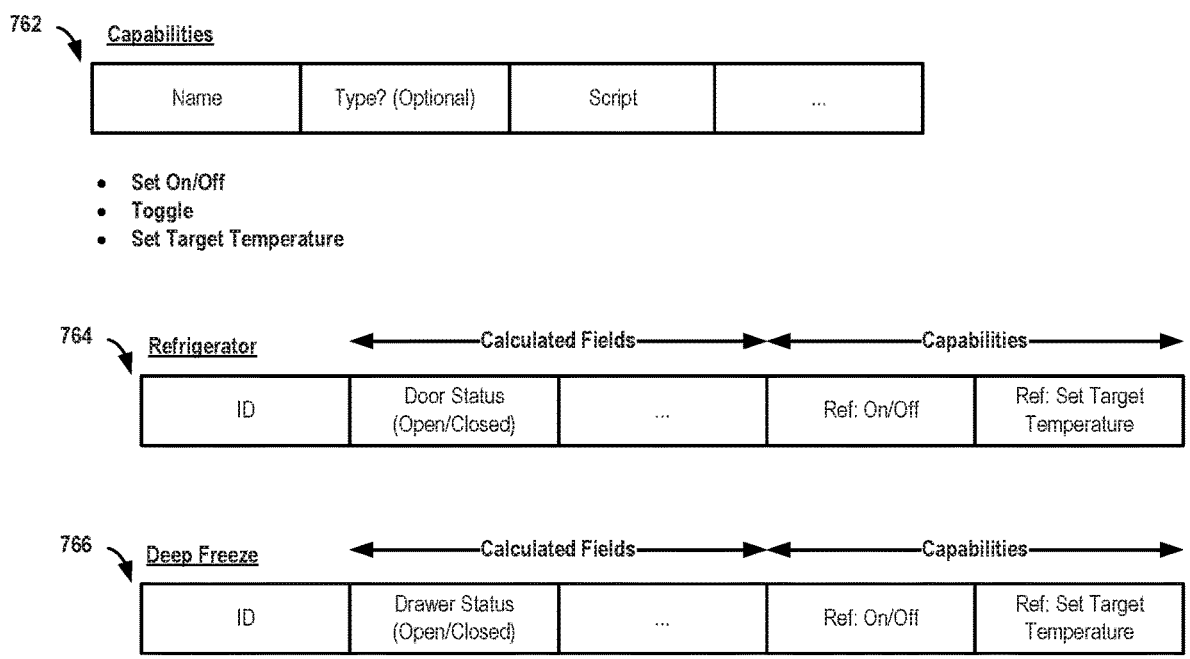
FIG. 7E depicts an example state representation of communication environment capabilities involving a refrigeration system, in accordance with example embodiments.

FIG. 7E depicts an example state representation of communication environment capabilities involving a remote network management architecture including refrigeration system 700, in accordance with example embodiments. Specifically, FIG. 7E depicts an example state capabilities based on processing information received from the sensors and actuators in refrigeration system 700 (such as that illustrated in compositional view of the refrigeration system shown in FIG. 7B and the example state representations of FIG. 7C). In FIG. 7E, an example state representation 762 of communication environment capabilities is provided for a refrigeration system (e.g., as shown in FIG. 7B). This representation includes indicators for a variety of metrics that are capable of being observed and calculated (shown here as "Name," "Type? (Optional)," "Script" and so on (shown here as " . . . ")), which may include setting the system in an on or off mode based on one or more conditions, toggling between calculated metrics, setting target temperatures for the system (or its subparts (e.g., RU1, RU2, and/orRU3)), and so on. Contributing to these capabilities of the refrigeration system in FIG. 7E is data from each of the sensors and actuators in the refrigeration units, including those in the refrigerator portion, shown here as example state representation of communication environment capabilities 764 that includes indicators for a variety of metrics (shown here as "ID,"), as well as calculated fields (shown here as "Door Status (Open/Closed)" and so on (shown here as " . . . ")) and capabilities (shown here as "Ref: On/Off" and "Ref: Set Target Temperature"), as well as those in the deep-freeze portion, shown here as example state representation of communication environment capabilities 766 that includes indicators for a variety of metrics (shown here as "ID,"), as well as calculated fields (shown here as "Drawer Status (Open/Closed)" and so on (shown here as " . . . ")) and capabilities (shown here as "Ref: On/Off" and "Ref: Set Target Temperature").

Figure 8:
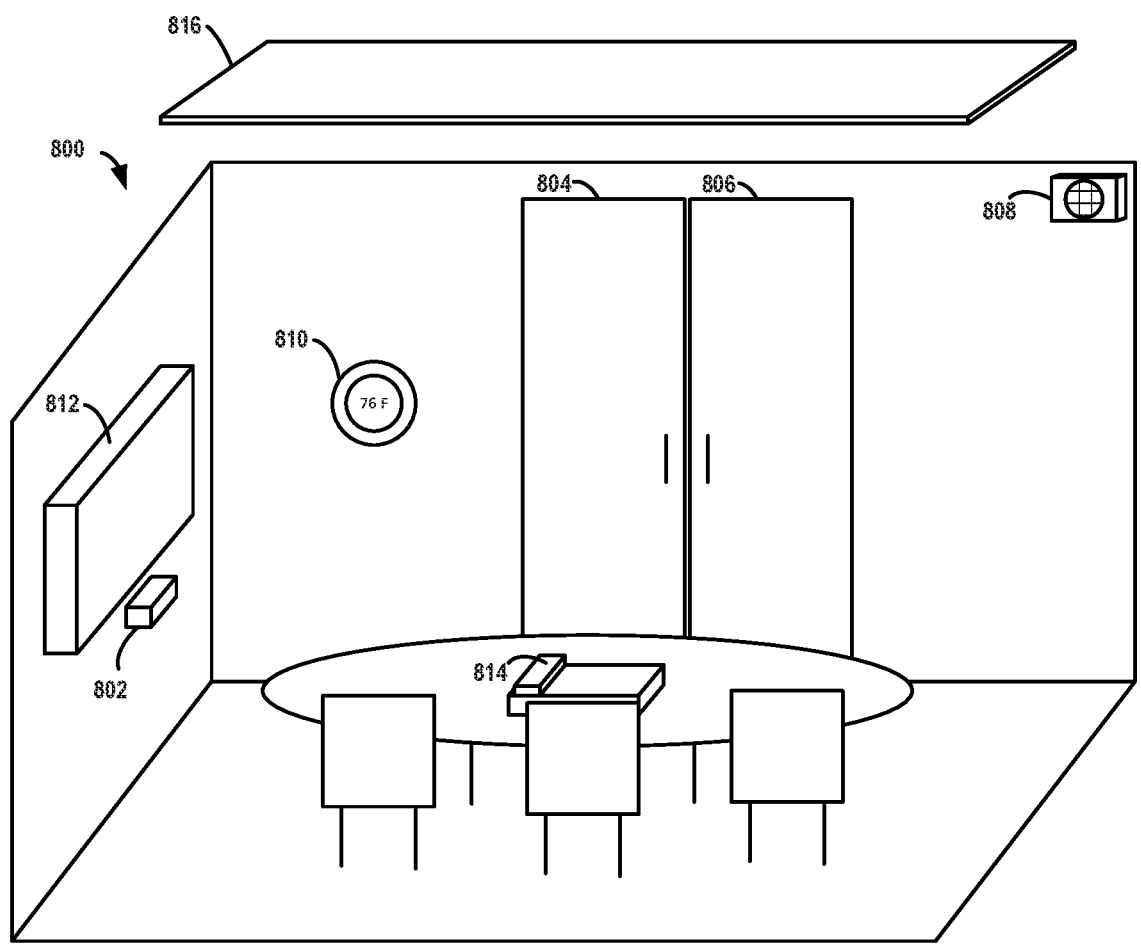
FIG. 8 depicts another communication environment involving a remote network management architecture including a conference room system, in accordance with example embodiments.

FIG. 8 depicts a conference room system 800 that includes an integrated edge gateway 802, a left conference room door actuator 804, a right conference room door actuator 806, a motion sensor 808, a thermostat 810, a television 812, a telephone 814, and adjustable lighting fixture 816. Here, edge gateway 802 and all of the devices in conference room system 800 operate on a network (e.g., like managed network 600 in FIG. 6A).

In this system, edge gateway 802, although not specifically illustrated, is also in communication with a computational instance (e.g., as illustrated in FIG. 6A at 322), or a proxy server in communication with a computational instance (e.g., as illustrated in FIG. 5A at 302 and 322, respectively). Either way, edge gateway 802 may discover the states and capabilities of all of the devices in the conference room system 800 via a standardized or proprietary protocol, as further detailed above.

Assuming edge gateway 802 discovers all of the states and capabilities of these devices in conference room system 800, although the devices may seem fairly unrelated (compared to, for example, the sensors and actuators in refrigerator system 700) the edge gateway may control all of the devices in conference room system 800 based on an established local program or logic, with one more predefined operational parameters (e.g., if motion sensor 808 detects motion, send a command to adjustable lighting fixture 816 to operate at predetermined level and color). Further, this orchestration of devices in conference room system 800 may be updated periodically and/or dynamically based on the state and capabilities of the individual devices, or the sub-environment, environment, or network in which they are operating, and via one or more protocols.

For example, edge gateway 802 may be configured to run a local program at a specified time (e.g., 8 a.m., Pacific Standard Time), that causes it to send commands to door actuators 804 and 806 to open the conference rooms doors, adjustable light fixture 816 to operate at a predetermined level and color, television 812 to display the morning news, and thermostat 810 to ensure the conference room temperature is 76 degree Fahrenheit (and if not, adjust an associated HVAC system accordingly). Then, for example, in response to an outgoing call being placed via telephone 814, edge gateway 802 may run local programs that cause it to send commands reverting some of the conditions it created that may not be as conducive to a conference call (e.g., send commands to door actuators 804 and 806 to close the conference rooms doors, to television 812 to turn off, and to adjustable light fixture 816 to operate at a different predetermined level and color because television 812 is now off). Finally, in this example, when the call is completed via telephone 814, edge gateway 802 may run another local program that causes it to send commands reestablishing some of the conditions it created prior to the conference call (e.g., send commands to door actuators 804 and 806 to reopen the conference rooms doors, to television 812 to turn back on, and to adjustable light fixture 816 to operate at the original predetermined level and color because television 812 is back on again). Thus, edge gateway 802 may act responsively to conditions that occur within conference room system 800 without further input from computational instance 322.

Aside from being able to run local programs or logic in conference room system 800, however, edge gateway 802 may also send discovered information to the computational instance 322 in the form of one or more digital representations. This may be facilitate further processing and management insight from the computational instance for the devices in the conference room system.

For example, knowing the attributes of the devices (e.g., states and capabilities) in conference room system 800, edge gateway 802 may actively track how many times per day over a specified time period (e.g., from 8 to 10 a.m., Pacific Standard Time) it performs the process described above of responding to an outgoing conference call via telephone 814. Edge gateway 802 may then create digital representations of the frequency of this process, as well as discovered device data (e.g., frequency of incoming conference calls via telephone 814), and send them to computational instance 322 for further storage and analysis.

In response, computational instance 322 may create a task that contains logic reconfiguring these processes by edge gateway 802 based on other factors (e.g., begin closing the conference rooms doors and turning off the television for incoming calls as well, only perform any of these processes during a specific time period and only on weekdays). In other examples, however, the task created by computational instance 322 in response to receiving the digital representations of the processes above may be more targeted (e.g., turn off television 812 until further notice). Either way, as described above, the detail and granularity of these digital representations can be adjusted based on requests by the computational instance (e.g., based on optimized workflow in the enterprise), the user (e.g., based on the user's selection of the most meaningful representation of conference room system 800, or the devices it wants to interact with, generally, or at that time specifically, via the user interface), or other such conditions. Accordingly, this process may progress iteratively or recursively.

Like other example embodiments illustrated herein, computational instance 322 may also catalog and analyze information contained in the digital representations regarding dependencies and relationships between the devices in conference room system 800, and these dependencies and relationships may be displayed on a web-based interface and/or represented in a hierarchical fashion. Thus, like other systems discussed herein, adding, changing, or removing such dependencies and relationships may be accomplished by way of an intuitive user interface.

Figure 9:
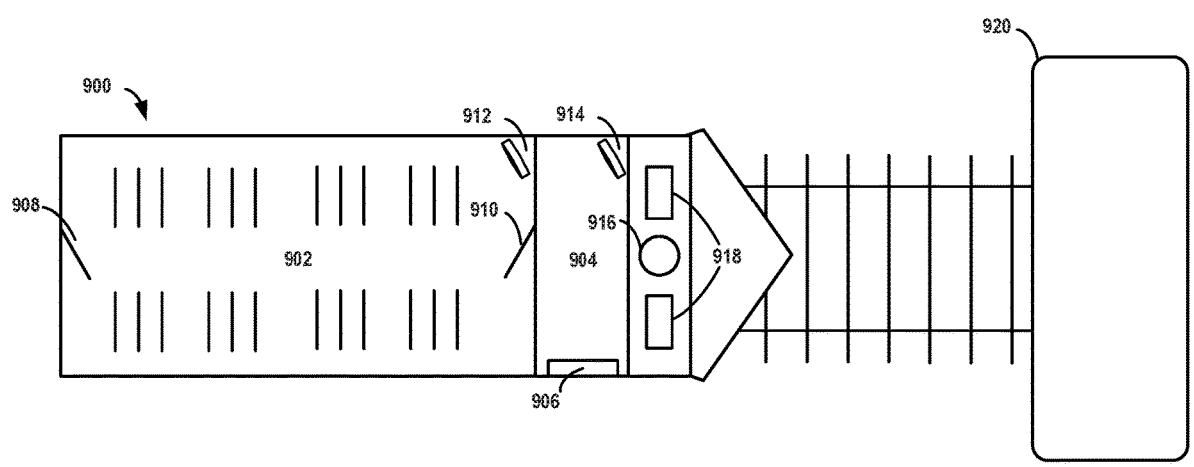
FIG. 9 depicts another communication environment involving a remote network management architecture including a passenger train system, in accordance with example embodiments.

FIG. 9 depicts a passenger train system 900 that includes a passenger compartment 902, a conductor compartment 904, an integrated edge gateway 906, a rear door actuator 908, a front door actuator 910, a passenger compartment motion sensor 912, a conductor compartment motion sensor 914, operation hub 916, and display panels 918 configured to display a user interface. Here, again, edge gateway 906 and all of the devices in passenger train system 900 operate on a network (e.g., like managed network 600 in FIG. 6A) and edge gateway 906 may discover the states and capabilities of some or all of the devices in the passenger train system 900 via standardized or proprietary protocols, as further detailed above.

In this system, edge gateway 906, although not specifically illustrated, is also in communication with a computational instance (e.g., as illustrated in FIG. 6A at 322), or a proxy server in communication (e.g., wireless communication) with a computational instance (e.g., as illustrated in FIG. 5A at 302 and 322, respectively).

Assuming edge gateway 906 discovers the states and capabilities of these devices in passenger train system 900, although the devices may seem fairly unrelated (like conference room system 800), edge gateway 906 may control and orchestrate the devices in passenger train system 900 based on an established local program or logic, with one more predefined operational parameters (e.g., if motion sensor 912 detects sudden motion in passenger compartment 902, send command to door actuators 908 and 910 to close doors, or if motion sensor 914 does not detect motion in conductor compartment 904, send command to front door actuator 910 to open door so conductor may be checked on by passengers, if door actuators 908 and/or 910 are forced open by the doors being opened, send command to operation hub 916 to stop the train, etc.). Further, although this orchestration of devices may be updated periodically and/or dynamically based on the state and capabilities of the individual devices, FIG. 9 presents a scenario in which these devices and the edge gateway may lose connectivity with computational instance 322 via tunnel 920 and be restricted to running local programs and logic, and to gathering, converting, organizing, and batching information from discovered devices, as well creating digital representations based only on the same (i.e., via a "local network").

For example, edge gateway 906 may be configured to run a local program based on operational parameters of the passenger train via data received from passenger train operation hub 916 (e.g., the train begins travelling over 50 mph), that causes it to send commands to door actuators 908 and 910 to close the doors, turn on motion sensors 912 and 914, and cause display panels 918 to display a user interface summarizing information about the passenger train's operation (e.g., current speed, whether passenger compartment motion sensor 912 is detecting any passenger movement, whether door actuators 908 and 910 have closed the doors, etc.).

In this scenario, because edge gateway 906 may be configured to run local programs or logic for all of the devices in passenger train system 900, once the passenger train enters tunnel 920, the edge gateway will be able to continue to discover and manage devices under protocol it has established with devices on the network the instance it loses connectivity with computational instance 322, as well as any devices that may join the network between the time the edge gateway loses connectivity when entering tunnel 920 and then regains connectivity after exiting the tunnel (e.g., a passenger turning on a computing device for the first time in the tunnel, additional passenger cars (containing numerous new devices) being added within the tunnel, etc.).

In one scenario, after edge gateway 906 loses connectivity with the computational instance, edge gateway 906 may default to running a local program that causes it to continue to command any device it detects on the local network to report its state and capabilities, and, if edge gateway can't effectively communicate with a specific device (e.g., via a proprietary protocol), then it may ignore the partially discovered device for device management purposes.

In another scenario, however, edge gateway 906 may still send discovered information (even if only partially discovered) to computational instance 322 in the form of one or more digital representations for further processing (e.g., management insight from the computational instance for the devices in the passenger train system), regardless of the loss of connectivity with the computational instance.

For example, knowing all of the attributes of the devices (e.g., states and capabilities) in passenger train system 900, and detecting one or more new devices joining the local network during the loss of connectivity that it cannot effectively communicate with, edge gateway 906 may actively track and catalog any changes during this loss of connectivity, both for the known and unknown devices on the local network. For example, during the loss of connectivity, if the conductor decides he no longer wants to see a particular metric displayed via user interface on display panels 918 (e.g., whether the rear door actuators 908 has closed the door, etc.) or adjust the granularity of a particular metric (e.g., instead of seeing whether door actuators 908 and 910 have closed the doors individually, the conductor elects to only be notified via the user interface if any door is open), then he may be able to adjust those displayed metrics via the user interface locally. Because these adjustments may have further reaching consequences on the edge gateway's ability to manage the devices in passenger train system 900 once connectivity is reestablished, however, they are worth tracking and potentially reporting to the computational instance.

For example, based on the conductor's selection of the most meaningful representation of passenger train system 900 or the devices he wanted to interact with therein, the manner in which edge gateway 906 discovers and converts discovered device information into digital representations for computational instance 322 (as well as the way it organizes and/or batches the same), may be adjusted by computational instance 322 (e.g., based on optimized workflow as re-determined in the enterprise after connectivity was reestablished), and may be delivered to edge gateway 906 via a number of methods (e.g., via an updated task). In this way, a seemingly local response to a display screen may cause computational instance 322 to create a task reconfiguring the local program or logic run by edge gateway 906 (e.g., via an edge gateway software application) to discover device information and convert it to a digital representation computational instance 322 is configured to process moving forward.

In another example, during the loss of connectivity, edge gateway 906 may detect one or more new devices that have joined the local network that it cannot effectively communicate with (e.g., based on a proprietary protocol). In this example, instead of ignoring the device it may have not be able to effectively communicate with initially, until connectivity is reestablished, edge gateway 906 can convert, organize, and batch the information it received into digital representations that are well understood by and potentially useful for computational instance 322.

Then, once connectivity is reestablished, the computational instance may store the information and/or generate new tasks for edge gateway 906 to implement (e.g., generate a task for edge gateway 906 to run updated logic that allows edge gateway 906 to be configured to communicate with the partially discovered device), which may result in further information being discovered by the edge gateway. In this way, capturing the instance of a device with which edge gateway 906 may not be able to communicate during the loss of connectivity may cause computational instance 322 to create a task reconfiguring the local program or logic run by edge gateway 906 to discover similar device information it would not otherwise know how to discover, and convert it to a meaningful digital representations for computational instance 322 moving forward.

And of course, like other example embodiments illustrated herein, computational instance 322 may also catalog and analyze information contained in the digital representations regarding dependencies and relationships between the devices in passenger train system 900, and these dependencies and relationships may be displayed on a web-based interface and/or represented in a hierarchical fashion, the addition, change, or removal of may be accomplished by way of an intuitive user interface, as discussed above.

VII. Example Operations

Figure 10:
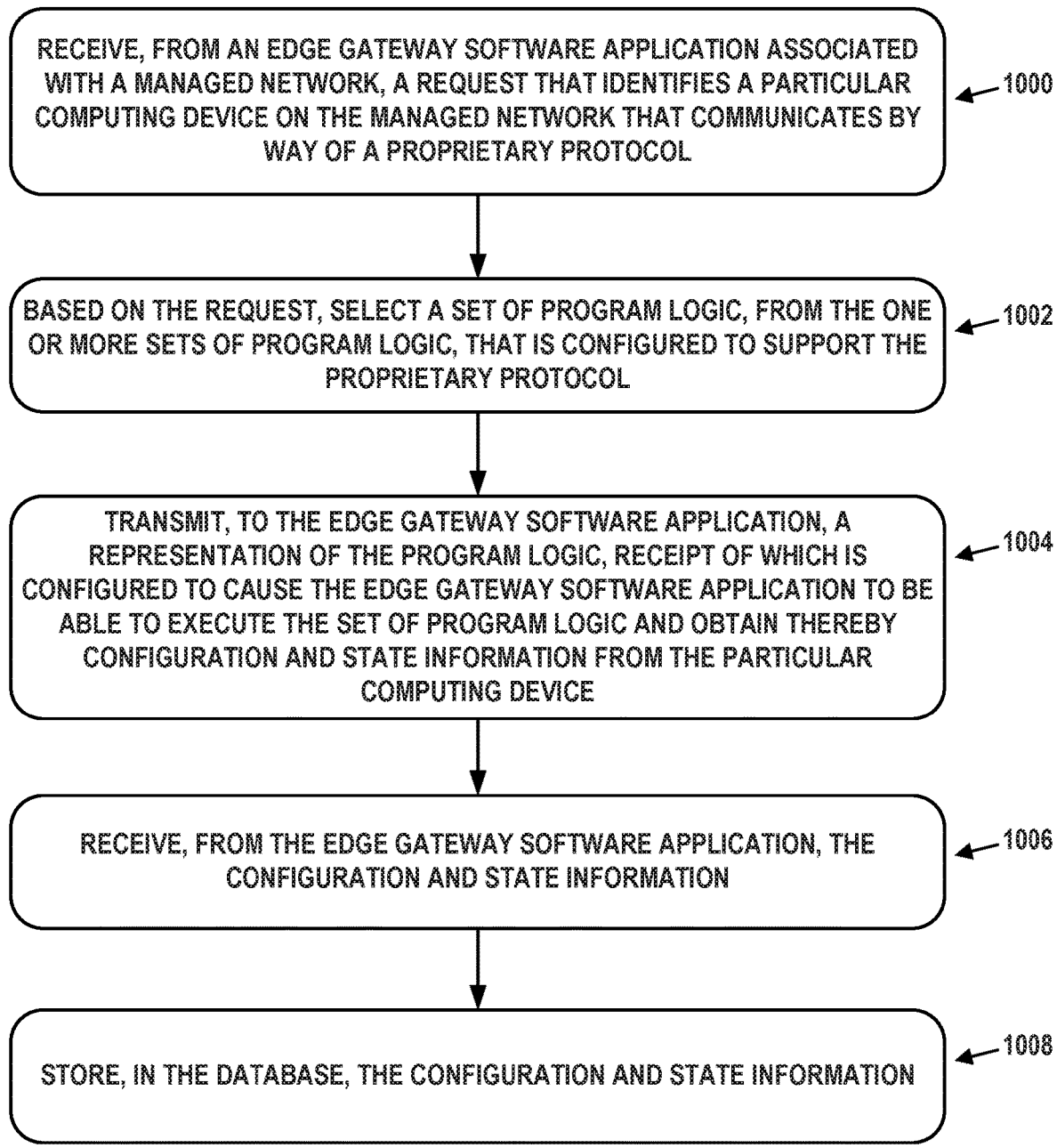
FIG. 10 is a flow chart, in accordance with example embodiments.

FIG. 10 is a flow chart illustrating an example embodiment. The process illustrated by FIG. 10 may be carried out by a computing device, such as computing device 100, and/or a cluster of computing devices, such as server cluster 200. However, the process can be carried out by other types of devices or device subsystems. For example, the process could be carried out by a portable computer, such as a laptop or a tablet device.

The embodiments of FIG. 10 may be simplified by the removal of any one or more of the features shown therein. Further, these embodiments may be combined with features, aspects, and/or implementations of any of the previous figures or otherwise described herein.

In FIG. 10, a computational instance that manages a managed network containing computing devices, at least some of which communicate by way of a proprietary protocol is illustrated. The computational instance includes comprising a database storing representations of the computing devices in the managed network as configuration items, and one or more sets of program logic configured to support the proprietary protocol, and one or more server devices configured to perform several steps. Furthermore, the managed network may be communicatively coupled to the computational instance by way of at least one wireless network.

At block 1000, the one or more server devices receive, from an edge gateway software application associated with the managed network, a request that identifies a particular computing device on the managed network that communicates by way of the proprietary protocol. In some embodiments, the request may identify the particular computing device by specifying an open transmission control protocol (TCP) or user datagram protocol (UDP) port on the particular computing device.

At block 1002, the one or more server devices, based on the request, select a set of the program logic, from the one or more sets of program logic, that is configured to support the proprietary protocol.

At block 1004, the one or more server devices transmit, to the edge gateway software application, a representation of the program logic, receipt of which is configured to cause the edge gateway software application to be able to execute the set of program logic and obtain thereby configuration and state information from the particular computing device. Additionally, the representation of the program logic may be a script that is executable by the edge gateway software application.

At block 1006, the one or more server devices receive, from the edge gateway software application, the configuration and state information.

At block 1008, the one or more server devices store, in the database, the configuration and state information. Additionally, the database may also store mappings between: (i) TCP or UDP ports, and (ii) the sets of program logic, and wherein selecting the set of program logic comprises finding a mapping from the open TCP or UDP port on the particular computing device to the set of program logic.

Figure 11:
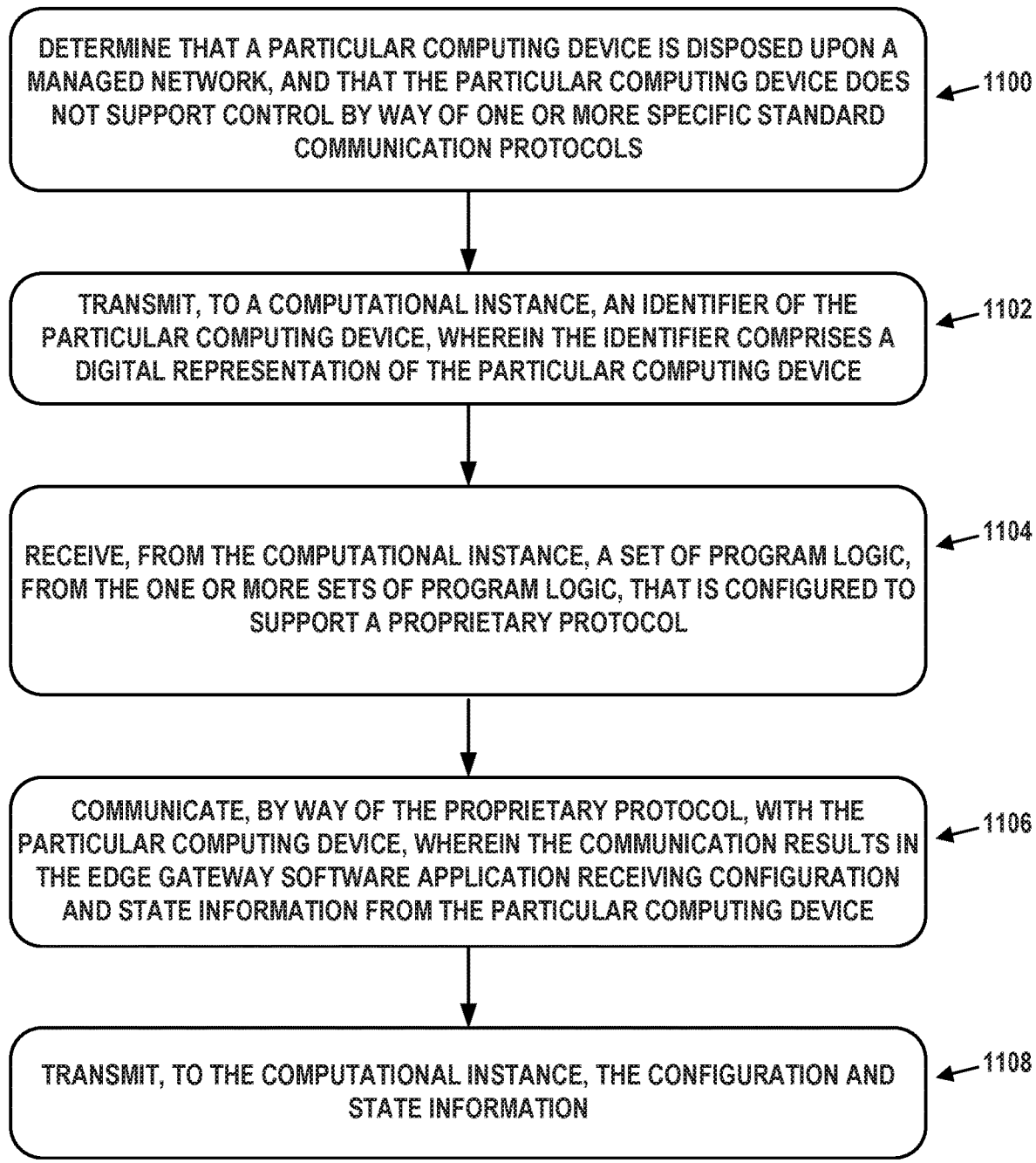
FIG. 11 is a flow chart, in accordance with example embodiments.

FIG. 11 is a flow chart illustrating an example embodiment. The process illustrated by FIG. 11 may be carried out by a computing device, such as computing device 100, and/or a cluster of computing devices, such as server cluster 200. However, the process can be carried out by other types of devices or device subsystems. For example, the process could be carried out by a portable computer, such as a laptop or a tablet device.

The embodiments of FIG. 11 may be simplified by the removal of any one or more of the features shown therein. Further, these embodiments may be combined with features, aspects, and/or implementations of any of the previous figures or otherwise described herein.

In FIG. 11, an edge gateway software application is configured for placement on the edge gateway device of a managed network is shown. The edge gateway software application is configured for communication with a computational instance of a remote network management platform, wherein the managed network contains computing devices and the computational instance manages the computing devices. In some embodiments, the managed network may be a local area network, personal area network, or a bus-based network. Furthermore, the managed network may be communicatively coupled to the computational instance by way of at least one wireless network.

At block 1100, the edge gateway software application is configured to determine that a particular computing device is disposed upon the managed network, and that the particular computing device does not support control by way of the one or more specific standard communication protocols. In some examples, the edge gateway software application may be configured to determine that the particular computing device is disposed upon the managed network by probing a range of Internet Protocol (IP) addresses of the managed network for devices configured with IP addresses within the range. In other examples, the edge gateway software application may be configured to determine that the particular computing device does not support control by way of the one or more specific standard communication protocols by attempting to probe the particular computing device by way of each of the one or more specific standard communication protocols and determining that the probes have failed to access the particular computing device.

At block 1102, the edge gateway software application is also configured to transmit, to the computational instance, an identifier of the particular computing device. Additionally, the identifier may specify an open transmission control protocol (TCP) or user datagram protocol (UDP) port on the particular computing device that is associated with the proprietary protocol.

At block 1104, the edge gateway software application is additionally configured to receive, from the computational instance, a set of program logic, from the one or more sets of program logic, that is configured to support a proprietary protocol. In a further aspect, the edge gateway software application may be further configured to install the set of program logic for execution by the edge gateway device. In addition, the set of program logic may be a script that is executable by the edge gateway device.

At block 1106, the edge gateway software application is also configured to communicate, by way of the proprietary protocol, with the particular computing device, wherein the communication results in the edge gateway software application receiving configuration and state information from the particular computing device. Furthermore, the edge gateway software application may also be configured to communicate, by way of the proprietary protocol, with the particular computing device by executing the set of program logic. In other examples, the edge gateway software application is also configured to communicate, by way of the proprietary protocol, with the particular computing device by accessing, by way of the proprietary protocol, the particular computing device and obtaining, by way of the proprietary protocol, the configuration state and information.

At block 1108, the edge gateway software application is additionally configured to transmit, to the computational instance, the configuration state and information.

VIII. Conclusion

The present disclosure is not to be limited in terms of the particular embodiments described in this application, which are intended as illustrations of various aspects. Many modifications and variations can be made without departing from its scope, as will be apparent to those skilled in the art. Functionally equivalent methods and apparatuses within the scope of the disclosure, in addition to those described herein, will be apparent to those skilled in the art from the foregoing descriptions. Such modifications and variations are intended to fall within the scope of the appended claims.

The above detailed description describes various features and operations of the disclosed systems, devices, and methods with reference to the accompanying figures. The example embodiments described herein and in the figures are not meant to be limiting. Other embodiments can be utilized, and other changes can be made, without departing from the scope of the subject matter presented herein. It will be readily understood that the aspects of the present disclosure, as generally described herein, and illustrated in the figures, can be arranged, substituted, combined, separated, and designed in a wide variety of different configurations.

With respect to any or all of the message flow diagrams, scenarios, and flow charts in the figures and as discussed herein, each step, block, and/or communication can represent a processing of information and/or a transmission of information in accordance with example embodiments. Alternative embodiments are included within the scope of these example embodiments. In these alternative embodiments, for example, operations described as steps, blocks, transmissions, communications, requests, responses, and/or messages can be executed out of order from that shown or discussed, including substantially concurrently or in reverse order, depending on the functionality involved. Further, more or fewer blocks and/or operations can be used with any of the message flow diagrams, scenarios, and flow charts discussed herein, and these message flow diagrams, scenarios, and flow charts can be combined with one another, in part or in whole.

A step or block that represents a processing of information can correspond to circuitry that can be configured to perform the specific logical functions of a herein-described method or technique. Alternatively or additionally, a step or block that represents a processing of information can correspond to a module, a segment, or a portion of program code (including related data). The program code can include one or more instructions executable by a processor for implementing specific logical operations or actions in the method or technique. The program code and/or related data can be stored on any type of computer readable medium such as a storage device including RAM, a disk drive, a solid state drive, or another storage medium.

The computer readable medium can also include non-transitory computer readable media such as computer readable media that store data for short periods of time like register memory and processor cache. The computer readable media can further include non-transitory computer readable media that store program code and/or data for longer periods of time. Thus, the computer readable media may include secondary or persistent long term storage, like ROM, optical or magnetic disks, solid state drives, compact-disc read only memory (CD-ROM), for example. The computer readable media can also be any other volatile or non-volatile storage systems. A computer readable medium can be considered a computer readable storage medium, for example, or a tangible storage device.

Moreover, a step or block that represents one or more information transmissions can correspond to information transmissions between software and/or hardware modules in the same physical device. However, other information transmissions can be between software modules and/or hardware modules in different physical devices.

The particular arrangements shown in the figures should not be viewed as limiting. It should be understood that other embodiments can include more or less of each element shown in a given figure. Further, some of the illustrated elements can be combined or omitted. Yet further, an example embodiment can include elements that are not illustrated in the figures.

While various aspects and embodiments have been disclosed herein, other aspects and embodiments will be apparent to those skilled in the art. The various aspects and embodiments disclosed herein are for purpose of illustration and are not intended to be limiting, with the true scope being indicated by the following claims.

What is claimed is:

1. A remote network management platform configured to manage a managed network, wherein one or more computing devices in the managed network communicate by way of a proprietary protocol and one or more additional computing devices in the managed network communicate by way of an additional protocol different than the proprietary protocol, the remote network management platform comprising:
a database configured to store representations of the one or more computing devices and the one or more additional computing devices in the managed network as a plurality of configuration items, and respective sets of program logic configured to support a plurality of communication protocols; and
one or more processors configured to:
receive, from an edge gateway software application associated with the managed network, one or more requests that identify a first computing device of the one or more computing devices in the managed network that communicates by way of the proprietary protocol and a second computing device of the one or more computing devices in the managed network that communicates by way of the additional protocol;
based on the one or more requests, select a first set of program logic from the respective sets of program logic that is configured to support the proprietary protocol and a second set of program logic from the respective sets of program logic that is configured to support the additional protocol;
transmit, to the edge gateway software application, a first representation of the first set of program logic and a second representation of the second set of program logic, wherein the edge gateway software application is configured to execute the first set of program logic to obtain a first set of configuration and state information from the one or more computing devices and the edge gateway software application is configured to execute the second set of program logic to obtain a second set of configuration and state information from the one or more additional computing devices;
receive, from the edge gateway software application, the first set of configuration and state information and the second set of configuration and state information; and
store, in the database, the first set of configuration and state information and the second set of configuration and state information as respective configuration items corresponding to the one or more computing devices and the one or more additional computing devices.

2. The remote network management platform of claim 1, wherein the one or more requests identify the first computing device, or the second computing device, or both, by specifying an open transmission control protocol (TCP) or user datagram protocol (UDP) port associated with the first computing device, the second computing device, or both.

3. The remote network management platform of claim 2, wherein the database is configured to store respective mappings between: (i) TCP or UDP ports, and (ii) the respective sets of program logic, and wherein selecting the first set of program logic comprises finding a mapping from the open TCP or UDP port associated with the first computing device to the first set of program logic.

4. The remote network management platform of claim 1, wherein the managed network is communicatively coupled to the remote network management platform by way of at least one wireless network.

5. The remote network management platform of claim 1, wherein the first representation of the first set of program logic, or the second representation of the second set of program logic, or both, comprise a script that is executable by the edge gateway software application.

6. A method comprising:
receiving, by a server device associated with a remote network management platform and from an edge gateway software application associated with a managed network, one or more requests that identify a first computing device of one or more computing devices in the managed network that communicate by way of a proprietary protocol and a second computing device of one or more additional computing devices in the managed network that communicate by way of an additional protocol, wherein the remote network management platform includes a database configured to store representations of the one or more computing devices and the one or more additional computing devices in the managed network as a plurality of configuration items, and respective sets of program logic configured to support a plurality of communication protocols;
based on the one or more requests, selecting, by the server device, a first set of program logic from the respective sets of program logic that is configured to support the proprietary protocol and a second set of program logic from the respective sets of program logic that is configured to support the additional protocol;
transmitting, by the server device and to the edge gateway software application, a first representation of the first set of program logic and a second representation of the second set of program logic, wherein the edge gateway software application is configured to execute the first set of program logic to obtain a first set of configuration and state information from the one or more computing devices and the edge gateway software application is configured to execute the second set of program logic to obtain a second set of configuration and state information from the one or more additional computing devices;
receiving, by the server device and from the edge gateway software application, the first set of configuration and state information and the second set of configuration and state information; and
storing, by the server device and in the database, the first set of configuration and state information and the second set of configuration and state information as respective configuration items corresponding to the one or more computing devices and the one or more additional computing devices.

7. The method of claim 6, wherein the one or more requests identify the first computing device, or the second computing device, or both, by specifying an open transmission control protocol (TCP) or user datagram protocol (UDP) port associated with the first computing device, the second computing device, or both.

8. The method of claim 7, wherein the database is configured to store respective mappings between: (i) TCP or UDP ports, and (ii) the respective sets of program logic, and wherein selecting the first set of program logic comprises finding a mapping from the open TCP or UDP port associated with the first computing device to the first set of program logic.

9. The method of claim 6, wherein the managed network is communicatively coupled to the remote network management platform by way of at least one wireless network.

10. The method of claim 6, wherein the first representation of the first set of program logic, or the second representation of the second set of program logic, or both, comprise a script that is executable by the edge gateway software application.

11. A non-transitory, computer-readable medium, comprising instructions that when executed by one or more processors, cause the one or more processors to perform operations comprising:
receive, from an edge gateway software application associated with a managed network, one or more requests that identify a first computing device of one or more computing devices in the managed network that communicate by way of a proprietary protocol and a second computing device of one or more additional computing devices in the managed network that communicates by way of an additional protocol;
selecting, based on the one or more requests, a first set of program logic and a second set of program logic from respective sets of program logic in a database, wherein the first set of program logic is configured to support the proprietary protocol and the second set of program logic is conifgured to support the additional protocol;
transmitting, to the edge gateway software application, a first representation of the first set of program logic and a second representation of the second set of program logic, wherein the edge gateway software application is configured to execute the first set of program logic to obtain a first set of configuration and state information from the one or more computing devices and the edge gateway software application is configured to execute the second set of program logic to obtain a second set of configuration and state information from the one or more additional computing devices;
receiving, from the edge gateway software application, the first set of configuration and state information and the second set of configuration and state information; and
storing, in the database, the first set of configuration and state information and the second set of configuration and state information as respective configuration items corresponding to the one or more computing devices and the one or more additional computing devices.

12. The non-transitory, computer-readable medium of claim 11, wherein the one or more requests identify the first computing device, or the second computing device, or both, by specifying an open transmission control protocol (TCP) or user datagram protocol (UDP) port associated with the first computing device, the second computing device, or both.

13. The non-transitory, computer-readable medium of claim 12, wherein the database is configured to store respective mappings between: (i) TCP or UDP ports, and (ii) the respective sets of program logic, and wherein selecting the first set of program logic comprises finding a mapping from the open TCP or UDP port associated with the first computing device to the first set of program logic.

14. The non-transitory, computer-readable medium of claim 11, wherein the managed network is communicatively coupled to a remote network management platform by way of at least one wireless network.

15. The non-transitory, computer-readable medium of claim 11, wherein the first representation of the first set of program logic, or the second representation of the second set of program logic, or both, comprise a script that is executable by the edge gateway software application.

* * * * *